(12) United States Patent
Yang et al.

(10) Patent No.: US 12,745,110 B2
(45) Date of Patent: Sep. 22, 2026

(54) METHODS AND APPARATUSES FOR ENHANCED 5GC RESTORATION WHEN A NETWORK FUNCTION (NF) SET IS DEPLOYED IN THE NETWORK

(71) Applicant: Telefonaktiebolaget LM Ericsson (publ), Stockholm (SE)

(72) Inventors: Yong Yang, Kållered (SE); Yunjie Lu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 227 days.

(21) Appl. No.: 17/910,718

(22) PCT Filed: Mar. 29, 2021

(86) PCT No.: PCT/EP2021/058204
§ 371 (c)(1),
(2) Date: Sep. 9, 2022

(87) PCT Pub. No.: WO2021/198207
PCT Pub. Date: Oct. 7, 2021

(65) Prior Publication Data

US 2024/0298196 A1 Sep. 5, 2024

(30) Foreign Application Priority Data

Mar. 31, 2020 (WO) ................ PCT/CN2020/082505

(51) Int. Cl.
*H04W 24/04* (2009.01)
*H04L 41/0654* (2022.01)

(52) U.S. Cl.
CPC ......... *H04W 24/04* (2013.01); *H04L 41/0654* (2013.01)

(58) Field of Classification Search
CPC ........................... H04W 24/04; H04L 41/0654
See application file for complete search history.

(56) References Cited

U.S. PATENT DOCUMENTS

2021/0306211 A1* 9/2021 Landais .............. H04L 43/0817

FOREIGN PATENT DOCUMENTS

WO WO-2019210675 A1 * 11/2019 .......... G06F 11/1438
WO 2020030275 A1 2/2020

OTHER PUBLICATIONS

3GPP TSG CT WG4 Meeting #86bis C4-187420 (C4-187420), Vilnius, Lithuania Oct. 15-19, 2018, titled NF service restart detection by direct signalling between NFs (Year: 2018).*

(Continued)

*Primary Examiner* — Ayaz R Sheikh
*Assistant Examiner* — Christopher R Davis
(74) *Attorney, Agent, or Firm* — COATS & BENNETT, PLLC

(57) ABSTRACT

An enhanced communication of recovery information related to restart of a NF Service provider of NF consumer (e.g., NF Service Instance, NF Service Set, NF Instance, NF Set) is introduced. In exemplary embodiments, a recovery timestamp in a restart notification related to the restart of a NF Service provider or NF consumer is associated with the NF Service provider or NF consumer corresponding to the binding level of session contexts served by the service provider or NF consumer. The NF Service provider/consumer may be a NF Service Instance, NF Service Set, NF Instance and NF Set. In the case of a failure, the recovery timestamp populated in a recovery notification is matching the binding level of session contexts which will be affected by the failed NF Service provider/consumer. The recovery timestamp may be included in indirect signaling via a NRF and in direct signal between NFs. Further the recovery timestamp can be included in the header of a restart notification or in a message body of the restart notification. The restart notification may be a service request/response, noti- (Continued)

fication request/response, or a Subscription request/response.

13 Claims, 18 Drawing Sheets

(56) References Cited

OTHER PUBLICATIONS

3rd Generation Partnership Project (3GPP) Technical Specification (TS) 29.510 V16.3.0 titled 3rd Generation Partnership Project; Technical Specification Group Core Network and Terminals; 5G System; Network Function Repository Services; Stage 3 (Year: 2020).*

3rd Generation Partnership Project; Technical Specification Group Core Network and Terminals; 5G System; Restoration Procedures (Release 16); 3GPP TS 23.527 V16.2.0 (Dec. 2019).

3rd Generation Partnership Project; Technical Specification Group Services and System Aspects; System architecture for the 5G System; Stage 2 (Release 16); 3GPP TS 23.501 V16.4.0 (Mar. 2020).

3rd Generation Partnership Project; Technical Specification Group Services and System Aspects; Procedures for the 5G System (5GS); Stage 2 (Release 16); 3GPP TS 23.502 V16.4.0 (Mar. 2020).

3rd Generation Partnership Project; Technical Specification Group Core Network and Terminals: 5G System; Session Management Services; Stage 3 (Release 16); 3GPP TS 29.502 V16.3.0 (Mar. 2020).

3rd Generation Partnership Project; Technical Specification Group Core Network and Terminals; 5G System; Technical Realization of Service Based Architecture; Stage 3 (Release 16); 3GPP TS 29.500 V16.3.0 (Mar. 2020).

* cited by examiner

METHODS AND APPARATUSES FOR ENHANCED 5GC RESTORATION WHEN A NETWORK FUNCTION (NF) SET IS DEPLOYED IN THE NETWORK

TECHNICAL FIELD

The present disclosure relates generally to a signaling between network functions (NFs) in a communication network with a service-based architecture and, more particularly to methods and apparatus for signaling restart of a NF entity.

BACKGROUND

Release 16 (Rel-16) of the Fifth Generation (5G) standard by the Third Generation Partnership Project (3GPP) uses a Service-Based Architecture (SBA) in which the control plane functionality and common data repositories in the 5G core network (5GC) are implemented by independent, self-contained and reusable Network Functions (NFs). Service-based interfaces (SBIs) expose the functionality of the independent NFs and enable a Consumer NF (CNF) to access services offered by a Producer NF (PNF). A Network Repository Function (NRF) provides a centralized discovery framework to enable the exposure and discovery of the NFs. NF Instances register with the NRF, which maintains a record of all available NF Instances and supported services. A CNF can subscribe with the NRF to receive notification when the NRF adds or updates a NF registration so that the CNF is aware of available NF Instances of a given type or that provides a particular service. Request-response signaling is used to access and deliver services offered by a NF. When a CNF needs a particular service, the CNF selects a PNF and requests its services via request response signaling. Generally, the CNF sends a service request message to a PNF to request a service offered by the PNF. The PNF provides the service and sends a service response to the CNF indicating an outcome of the service and/or providing information about the service to the CNF.

The communication network may comprise multiple instances of a NF, referred to herein as NF Instances. Different NF Instances can serve different wireless devices or sessions. For example, different NF Instances may serve wireless devices or sessions in different geographic areas. Also, different NF Instances in the same geographic area may serve different wireless devices or sessions for load-balancing as an example. An NF Instance may, in turn, implement multiple instances of a NF Service, referred to herein as NF Service Instances. For example, different NF Service Instances within the same NF Instance may serve different wireless devices or sessions.

It is also common for different NF Instances or different NF Service Instances to provide services to the same wireless devices or sessions for redundancy and service continuity in the event of a failure. A rollover mechanism can be provided so that when a NF Instance or NF Service Instance fails, the service rolls over to another NF Instance or NF Service Instance. A group of NF Instances or NF Service Instances providing services for the same wireless device or session is referred to herein as a NF Set or NF Service Set respectively.

In the following discussion, the term NF entity refers to any entity that produces or consumers a NF Service. The NF entity could be a NF Set, NF instance, NF Service Set, or NF Service Instance. The NF entity can be identified by a Consumer ID together with a custom service. In this case, the Consumer ID identifies a NF Instance or NF Service Set. The term NF producer refers to a NF entity that provides a NF Service. The term NF consumer is a NF entity that consumes a NF Service.

When NF Set or NF Service Set is deployed, the redundancy of session context data may be offered at different levels. As an example, some session contexts may be accessible to all NF Service Instances in the same NF Service Set (i.e., binding level of those session contexts is at the NF Service Set level) while other session contexts are accessible to a single NF Service Instance. Similarly, some session contexts may be accessible to all the NF Instances in the same NF Set (i.e., binding level of those session contexts is NF Set level, while other session contexts are accessible to a single NF Instance).

When a session context is created in a NF producer, e.g., a NF Instance or NF Service Instance in PNF, a binding indication is provided indicating the redundancy level or binding level. In the event of a failure, the NF consumer, i.e., a NF Instance or NF Service Instance in a CNF, may, depending on the binding level, select an alternative service provider which is able to access the session context and thus provide continuity of service for the session. When a NF consumer requests creation of a new session context, the NF consumer may also provide a binding indication indicating alternative endpoint addresses, e.g., for callback addresses at the NF consumer for the session context.

When a NF Service provided by a NF Instance or NF Service Instance is restored after failure and recovery information is relayed via the NRF, a restart notification is provided by the NRF to subscribing NF consumers. The restart notification includes a recovery timestamp indicating the time of the recovery for the failed service provider (e.g., NF Instance or NF Service Instance). When NF Service provided by a NF Instance or NF Service Instance is restored and when the recovery information is provided via direct signaling, the recovery timestamp is associated with either a NF Service Instance when it is sent from a NF producer or a Consumer Identifier (Consumer ID), which may identify a NF Instance, when it is sent from a NF consumer.

The NF consumer (e.g., NF Instance or NF Service Instance level) generally assumes that all session contexts created by the NF producer prior to the time indicated by the recovery timestamp to be lost and takes appropriate action. When the failure is with a NF Instance or NF Service Instance and the binding for the session is to the NF Set or NF Service Set to which the NF Instance or NF Service Instance belongs, the NF consumer can select an alternative NF Instance or NF Service Instance from the NF Set or NF Service Set respectively to maintain continuity of the session. When the failure is with a NF Instance or NF Service Instance and the binding is to the NF Instance or NF Service Instance respectively, the NF consumer assumes that all session contexts created prior to the recovery timestamp to be lost.

An ambiguity may arise in the case that the recovery information is relayed via the NRF and where the failure is with a NF/NF Service Set instance and the binding level is set to NF/NF Service Set. When the NF/NF Service Set fails, all NF Service Instances handled by the NF will also fail. Following recovery of the failed NF, a NF consumer may receive a restart notification with a recovery timestamp indicating restart of one of the NF/NF Service Instances of the failed NF/NF Service Set. If the binding level is set to NF Service Set, the CNF may assume that PDU session was not lost, leaving the context hanging until the CNF initiates a new service request to reestablish the service. The hanging context can result in disruption of service.

Another ambiguity may arise in the case where the recovery information is signaled via direct signaling, e.g., from a NF producer to the NF consumer. When the failure is with a NF Service Set, NF Instance, or NF Set and the binding level is set to NF Service Set, NF Instance or NF Set respectively, the NF producer can only populate the recovery timestamp associated with NF Service Instance. This leads the NF consumer to assume that PDU session was not lost, leaving the context hanging until the NF consumer initiates sends service request to reestablish the service. As before, the hanging context can result in disruption of service.

SUMMARY

In exemplary embodiments of the disclosure, an enhanced communication of recovery information related to restart of a NF producer of NF consumer is introduced. In exemplary embodiments, a recovery timestamp in a restart notification from a NF producer or NF consumer is associated with the NF entity corresponding to the binding level of session contexts served by the NF producer or NF consumer. The NF entity may comprise a NF Service Instance, NF Service Set, NF Instance, or NF Set. The NF entity may be identified by a service name together with NF Instance and/or NF Set. In the case of a failure, the recovery timestamp populated in a recovery notification matches the binding level of session contexts which will be affected by the failed NF entity. The recovery timestamp may be included in indirect signaling via a NRF and in direct signal between NFs. Further the recovery timestamp can be included in the header of a restart notification or in a message body of the restart notification. The restart notification may be a service request/response, notification request/response, or a Subscription request/response.

A first aspect of the disclosure comprises methods implemented by a sending network node in a communication system of sending an enhanced restart notification to a receiving network node. In one embodiment, the method comprises associating recovery information in a restart notification related to the restart of a NF entity depending on a binding level of a session context served by the NF entity. The method further comprises sending, to a receiving network node, an enhanced restart notification including the recovery information.

A second aspect of the disclosure comprises methods implemented by a receiving network node in a communication system of receiving an enhanced restart notification from a sending network node. In one embodiment, the method comprises receiving, from a sending network node, an enhanced restart notification related to the restart of NF entity. The method further comprises associating the recovery information in the enhanced restart notification to the NF entity depending on a binding level of a session context served by the NF Service provider/consumer.

A third aspect of the disclosure comprises a sending network node in a communication system configured to signal a recovery time in a restart notification. The sending network node is configured to associate recovery information in a restart notification related to the restart of a NF entity depending on a binding level of a session context served by the NF entity. The sending network node is further configured to send, to a receiving network node, an enhanced restart notification including the recovery information.

A fourth aspect of the disclosure comprises a receiving network node in a communication system configured to receive, from a sending network node, an enhanced restart notification related to the restart of a NF entity. The receiving network node is further configured to associate the recovery information in the enhanced restart notification to the NF entity depending on a binding level of a session context served by the NF entity.

A fifth aspect of the disclosure comprises a sending network node in a communication system configured to signal a recovery time in a restart notification. The sending network node comprises communication circuitry for communication with a receiving network node and processing circuitry configured to associate recovery information in a restart notification related to the restart of a NF entity depending on a binding level of a session context served by the NF entity and to send, to a receiving network node, an enhanced restart notification including the recovery information.

A sixth aspect of the disclosure comprises a receiving network node in a communication system configured to receive a recovery time in a restart notification. The receiving network node comprises communication circuitry for communication with a sending network node and processing circuitry configured to receive, from a sending network node, an enhanced restart notification related to the restart of a NF entity and to associate the recovery information in the enhanced restart notification to the NF entity depending on a binding level of a session context served by the NF entity.

A seventh aspect of the disclosure comprises a computer program for a network node. The computer program comprises executable instructions that, when executed by processing circuitry in a network node in a communication network, causes the network node to associate recovery information in a restart notification related to the restart of a NF entity depending on a binding level of a session context served by the NF entity and to send, to a receiving network node, an enhanced restart notification including the recovery information.

An eighth aspect of the disclosure comprises a carrier containing a computer program according to the seventh aspect. The carrier is one of an electronic signal, optical signal, radio signal, or a non-transitory computer readable storage medium.

A ninth aspect of the disclosure comprises a computer program for a network node. The computer program comprises executable instructions that, when executed by processing circuitry in a network node in a communication network, causes the network node to receive, from a sending network node, an enhanced restart notification related to the restart of a NF entity and to associate the recovery information in the enhanced restart notification to the NF entity depending on a binding level of a session context served by the NF entity.

A tenth aspect of the disclosure comprises a carrier containing a computer program according to the ninth aspect. The carrier is one of an electronic signal, optical signal, radio signal, or a non-transitory computer readable storage medium.

DETAILED DESCRIPTION

Figure 1:
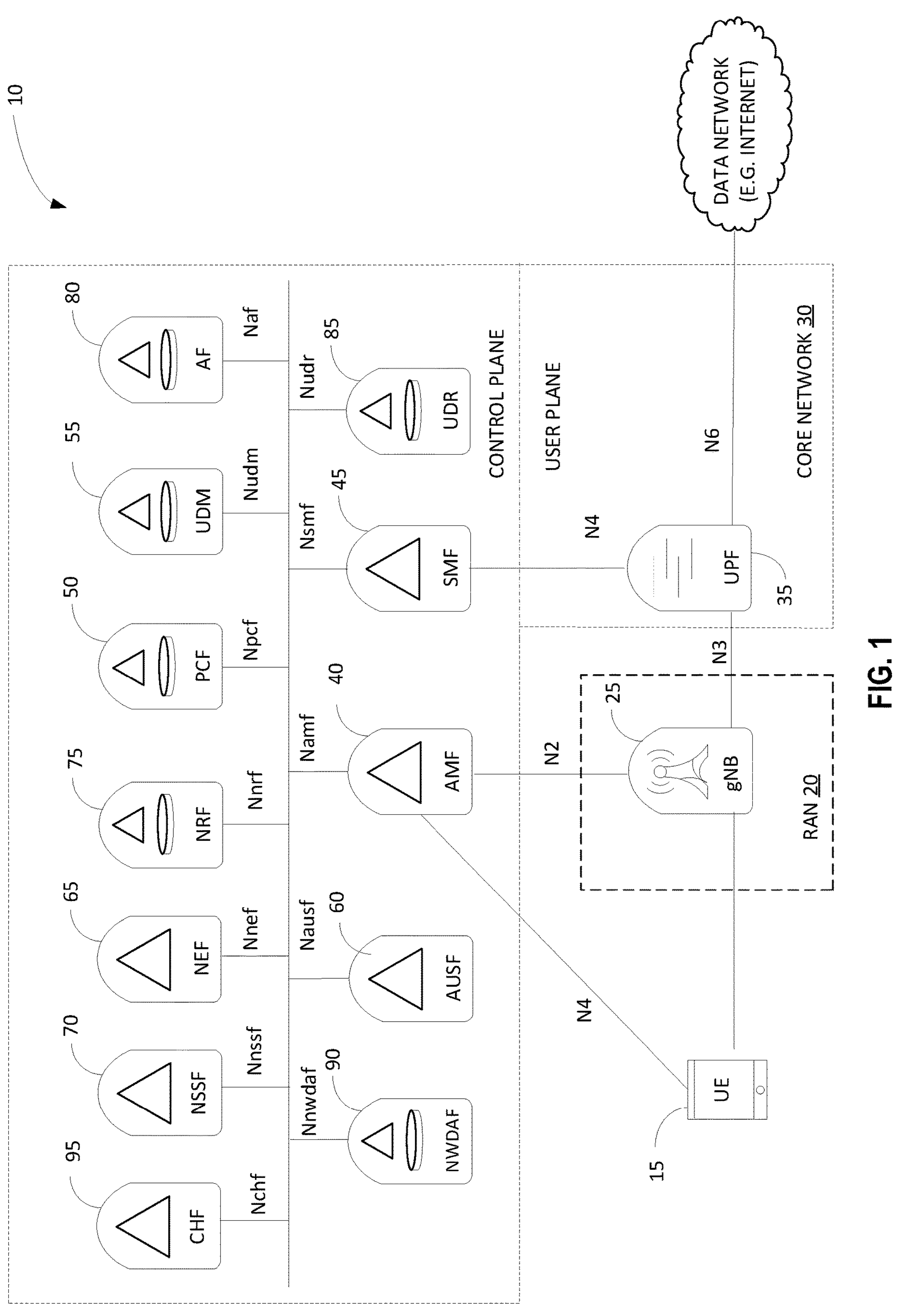
FIG. 1 illustrates a communication network implementing enhanced restart signaling as herein described.

Referring now to the drawings, an exemplary embodiment of the disclosure will be described in the context of to Release 16 (Rel-16) of the 5G standard by the Third Generation Partnership Project (3GPP) communication network according to Release 16 (Rel-16) of the 5G standard by the Third Generation Partnership Project (3GPP). Those skilled in the art will appreciate that the methods and apparatus herein described are not limited to use in 5G networks but may also be used in communication networks operating according to other standards that use a service-based architecture and provide restart notifications.

FIG. 1

FIG. 1 illustrates a communication network 10 according to one exemplary embodiment. The communication network 10 comprises a 5G radio access network (RAN) 20 and a core network 30 employing a service-based architecture according to Release 16 (Rel-16) of the 5G standard by the Third Generation Partnership Project (3GPP). The RAN 20 comprises one or more base stations 25 providing radio access to user equipment (UEs) 15, also called wireless devices, operating in the communication network 10. The base stations 25 are also referred to in applicable standards as gNodeBs (gNBs). The UEs 15 may comprise cellular phones, smart phones, tablets, laptop computers, or other electronic devices with communication capabilities. A UE 15 could also comprise a communication device or terminal that accesses the communication network 10 via a wireline service or connection. The core network 30, referred to herein as a 5G Core (5GC), provides a connection between the RAN 20 and other packet data networks, such as the Internet Protocol (IP) Multimedia Subsystem (IMS) or the Internet. Those skilled in the art will appreciate that other types of RANs in addition to the 5G RAN 25 can connect to the 5GC 30. For example, an Evolved Universal Mobile Telecommunications System (UMTS) Terrestrial Radio Access (EUTRA) base station in an Evolved UMTS Terrestrial Radio Access Network (EUTRAN) may also connect to the 5GC 30.

The 5GC 30 comprises a number of Network Function (NFs) including a User Plane Function 35, Access and Mobility Management Function (AMF) 40, Session Management Function (SMF) 45, a Policy Control Function (PCF) 50, a Unified Data Management (UDM) function 55, a Authentication Server Function (AUSF) 60, a Network Exposure Function (NEF) 65, a Network Slice Selection Function 70, a Network Repository Function (NRF) 75 an Application Functions (AFs) 80 (which may be located in the core network 30 or be external to the core network 30), a Unified Data Repository (UDR) 85, Network Data Analytics function (NWDAF) 90 and a Charging Function (CHF) 95. The NFs shown in FIG. 1 comprise logical entities that reside in one or more core network nodes, which may be implemented by one or more processors, hardware, firmware, or a combination thereof. The NFs may reside in a single core network node or may be distributed among two or more core network nodes. Further, the network 10 may include multiple instances of the NFs.

The communication network 10 uses a Service-Based Architecture (SBA) in which the control plane functionality and common data repositories in the 5GC 30 are implemented by independent, self-contained and reusable Network Functions (NFs). Service-based interfaces (SBIs) expose the functionality of the independent NFs and enable a CNF (CNF) to access services offered by a PNF.

FIG. 2A

Figure 2A:
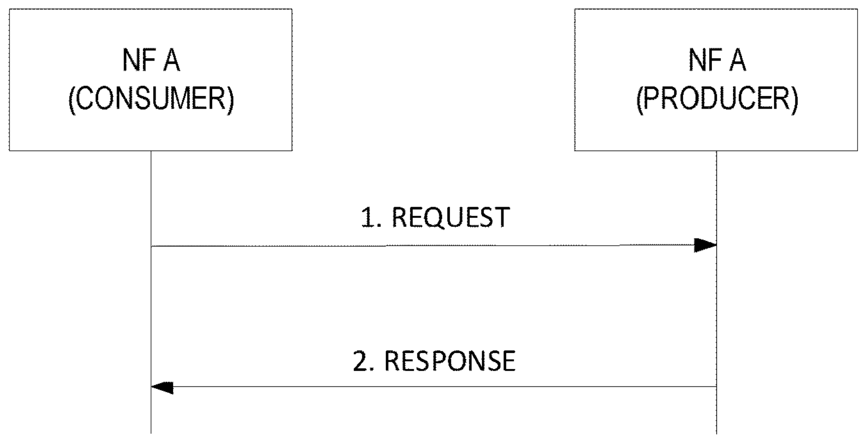
FIG. 2A is a signaling diagrams illustrating request-response signaling between a NF producer and NF consumer in a communication network.

The SBA services model relies on request-response signaling to access and deliver services offered by a NF. FIG. 2A illustrates request-response signaling for access and delivery of NF Services. When a CNF wants to access a particular service, the CNF selects a PNF and requests its services by sending a service request to the selected PNF (S1). The PNF provides the service and sends a service response to the CNF indicating an outcome of the service and/or providing information about the service to the CNF (S2). For example, when an AMF 40 wants to create a new Packet Data Unit (PDU) session context for a UE 15, the AMF 40 sends a PDU session establishment request to a SMF 45 to initiate a session establishment procedure to create a new PDU session. When the PDU session is established, the SMF 45 sends a PDU session establishment response to the AMF 40 with information about the new PDU session context for the UE 15.

A NRF 75 in the communication network 10 provides a centralized discovery framework to enable the exposure and discovery of the NFs and supported services. NF Instances registered with the NRF 75, which maintains a record of all available NF Instances and supported services. A CNF can subscribe with the NRF 75 to receive notification when the NRF 75 adds or updates a NF registration so that the CNF is aware of available NF Instances of a given type or that provide a particular service. In this context, the subscribing NF is a CNF for the status notification services offered by the NRF 75, which is a PNF.

FIG. 2B

Figure 2B:
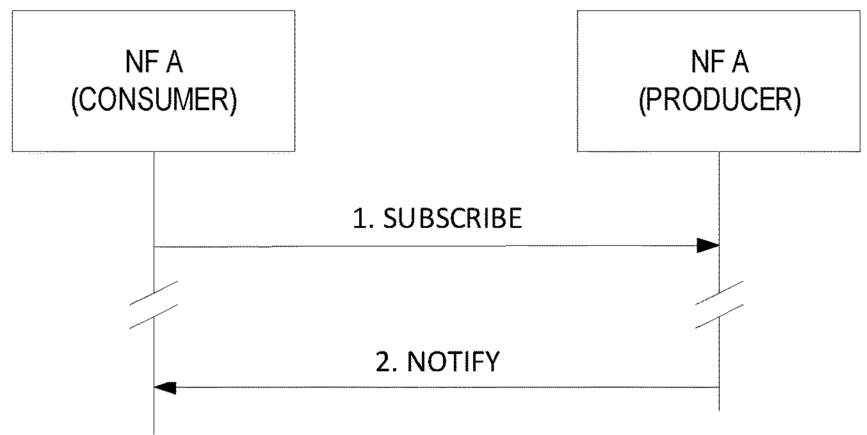
FIG. 2B is a signaling diagram illustrating subscription-notification signaling between a NF producer and a NF consumer in a communication network where the notification is sent to a NF consumer originating subscription request.

FIG. 2B illustrates subscribe-notify signaling between a PNF and CNF, which can be viewed as a special case of request-response signaling. In the context of service discovery, the PNF is typically the NRF 75, although the subscription model enables a CNF to subscribe to services offered by any PNF. The CNF sends a subscription request to the PNF (e.g., NRF 75) subscribing to notifications linked to an event trigger (S1). In the context of service discovery, the event trigger is the registration or registration update of a NF profile by the PNF, i.e., the NF that provides the notifications. The PNF responds to the subscription request (not shown) to confirm the subscription to a notification service linked to the event trigger. Upon occurrence of a triggering event, the PNF sends a notification to the CNF (S2).

FIG. 2C

Figure 2C:
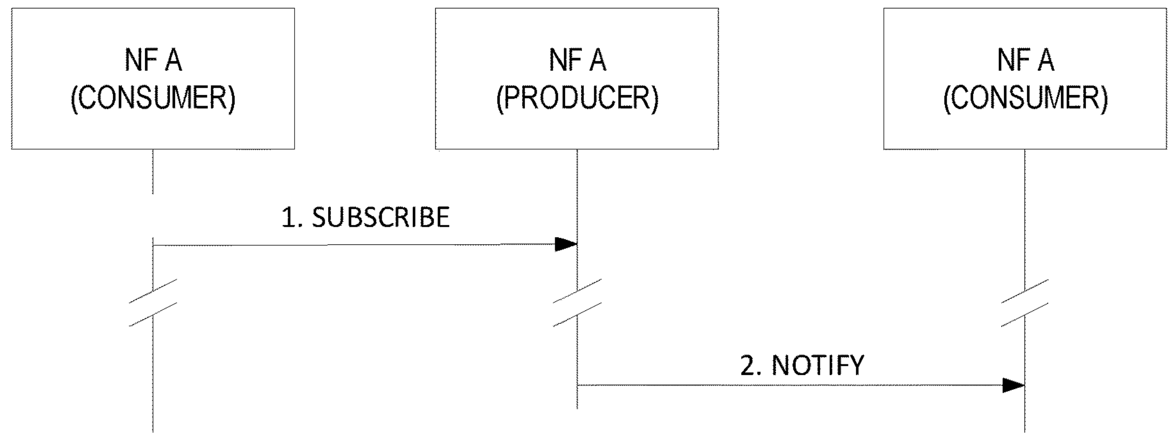
FIG. 2C is a signaling diagram illustrating subscription-notification signaling between a NF producer and NF consumer in a communication network where the originating NF consumer for the subscription request and terminating NF consumer for the notification are different.

FIG. 2C illustrates subscribe-notify signaling when the CNF sending the subscription request and the CNF receiving the notifications are different. In this scenario, a first CNF sends a subscription request to the PNF (e.g., NRF 75) subscribing to notifications linked to an event trigger (S1). The PNF responds to the subscription request (not shown) to confirm the subscription to a notification service linked to the event trigger. Upon occurrence of a triggering event (e.g., registration/registration update), the PNF sends a notification to a second CNF (S2).

The communication network 10 may deploy multiple instances of a NF, referred to herein as NF Instances, as specified in Rel 16 of 3GPP TS 23.501, 5.21.3.1. Different NF Instances can serve different UEs 15 or sessions. For example, different NF Instances may serve UEs 15 or sessions in different geographic areas. Also, different NF Instances in the same geographic area may serve different UEs 15 or sessions for other purposes, such as load-balancing. An NF Instance may, in turn, implement multiple instances of a NF Service, referred to herein as NF Service Instances. Different NF Service Instances within the same NF Instance may serve different wireless devices or sessions.

It is also common for different NF Instances and/or different NF Service Instances (referred to collectively as NF/NF Service Instances) to provide services to the same UEs 15 or sessions for redundancy and service continuity in the event of a failure. In this case, a NF/NF Service Instance can be replaced by an alternative NF/NF Service Instance within the same NF Set in case of scenarios such as failure, load balancing, load re-balancing, etc. In case of failure of NF/NF Service Instance, or to perform load re-balancing, the peer NF uses a "Binding Indication" to select alternative NF/NF Service Instance. A group of NF Instances or NF Service Instances providing services for the same wireless device or session is referred to herein as a NF Set or NF Service Set respectively. A rollover mechanism can be provided so that when a NF Instance or NF Service Instance fails, the service rolls over to another NF Instance or NF Service Instance.

When NF Set or NF Service Set is deployed, the redundancy of session context data may be offered at different levels. As an example, some session contexts may be accessible to all NF Service Instances in the same NF Service Set (i.e., binding level of those session contexts is at the NF Service Set level) while other session contexts are accessible to a single NF Service Instance. Similarly, some session contexts may be accessible to all the NF Instances in the same NF Set (i.e., binding level of those session contexts is NF Set level) while other session contexts are accessible to a single NF Instance.

A process called binding is used to indicate a suitable target NF producer instance(s) for use in the selection and reselection of NF/NF Service Instances associated with a specific NF producer resource (context) and NF Service, and for routing of subsequent requests. Binding allows a NF producer to indicate that the NF consumer, for a particular context, should be bound to a NF Instance, NF Set, NF Service Instance or NF Service Set depending on local policies and other criteria. Binding is described in detail in 3GPP TS 23.501, 6.3.1.0. To create a binding, the NF producer provides a Binding Indication to the NF consumer in request responses or notifications sent to the NF consumer to convey the scope within which selection/reselection of target NF/NF Services may be performed.

A NF consumer can also use binding to indicate a suitable NF consumer instance(s) for notification target instance reselection and routing of subsequent notification requests associated with a specific notification subscription. The NF consumer can also provide a Binding Indication to the NF producer for NF Services that the NF consumer produces for the same data context and that the NF producer is subsequently likely to invoke. To create a binding, the NF consumer includes a Binding Indication in request or subscriptions to convey the scope, i.e., binding level, within which selection/reselection of notification targets or the selection of other service(s) that the NF consumer produces for the same data context may be performed.

The term Binding Indication as used herein has the meaning ascribed in TS23.501, 6.3.1.0, which defines Binding Indication as follows:

Binding Indication: Information included by a NF producer to a NF consumer in request responses or notifications to convey the scope within which selection/reselection of target NF/NF Services may be performed, or information included by the NF consumer in requests or subscriptions to convey the scope within which selection/reselection of notification targets or the selection of other service(s) that the NF consumer produces for the same data context may be performed. See clause 6.3.1.0.

In exemplary embodiments, the Binding Indication is a custom Hypertext Transfer Propotocol (HTTP) header as defined in TS 29.500, 5.2.3.2.6.

2.1.1.1→5.2.3.2.6→3gpp-Sbi-Binding

This header contains a comma-delimited list of Binding Indications from an HTTP server for storage and subsequent use by an HTTP client (see clause 6.12).

The encoding of the header follows the ABNF as defined in IETF RFC 7230 [12].

3gpp-Sbi-Binding="3gpp-Sbi-Binding" ":" #(OWS "bl=" blvalue 1*(OWS ";" parameter))

blvalue="nfinstance"/"nfset"/"nfserviceinstance"/"nfserviceset"

parameter=parametername "=" token parametername="nfinst"/"nfset"/"nfservinst"/"nfserviceset"/"servname"/"scope"

scope="other-service"/"callback"/"subscription-events"

The scope parameter indicates the applicability of a Binding Indication in a service request. The scope parameter may take one of the following values:

other-service: the binding information applies to other service(s) that the NF consumer may later on provide as a NF producer (see clause 6.12.3);

"subscription-events: the binding information applies to subscription change event notifications (see clause 6.12.4);

callback: the binding information applies to notification or callback requests (see clauses 6.12.4 and 6.12.x). The absence of the callback parameter in a Binding Indication in a service request is interpreted as "callback". Also, two scope parameters may be present in a Binding Indication if the binding information applies to notification/callback requests and to other services.

servname (service name): indicates the name of a service, as defined in 3GPP TS 29.510 [8], or a custom service, i.e.:

the name of the service that handles a notification or a callback request, when present in a Binding Indication for a subscription or a callback, i.e., with a scope parameter absent or set to "callback"; or the name of the other service(s) for which the binding applies, when present in a Binding Indication in a service request for the other services the NF consumer can provide later on as a NF producer, i.e., with the scope parameter set to "other-service". More than one servname parameter may be present to represent multiple such services. The absence of this parameter in a Binding Indication with the scope parameter set to "other-service" shall be interpreted as binding information that applies to all the services that the NF consumer may provide later as a NF producer.

the definition and encoding of the blvalue and other parameters shall be as defined for the 3gpp-Sbi-Routing-Binding in clause 5.2.3.2.5.

As an example, the following is a subscription request from one NF on behalf of another NF with two Binding Indications.

3gpp-Sbi-Binding: bl=nfset; nfset=set1.udmset.5gc.mnc012.mcc345;

servname=nudm-ee;scope=subscription-events, bl=nfset;

nfset=set1.nefset.5gc.mnc012.mcc345; servname=nnef-event-exposure

As another example, the following is a service request with two Binding Indications, one for callback requests and one for other services the NF consumer may provide later as a NF producer.

3gpp-Sbi-Binding: bl=nfinstance; nfinst=54804518-4191-46b3-955c-ac631f953ed8;

nfset=set1.smfset.5gc.mnc012.mcc345;

servname=nsmf-pdusession, bl=nfinstance; nfinst=54804518-4191-46b3-955c-ac631f953ed8;

nfset=set1.smfset.5gc.mnc012.mcc345; scope=other-service; servname=nsmf-event-exposure When a session context is created in a NF producer, i.e., a NF Instance or NF Service Instance of a PNF, a binding indication is provided indicating the redundancy level or binding level. In the event of a failure, the NF consumer, i.e., a NF Instance or NF Service Instance of a CNF, may, depending on the binding level, select an alternative service provider which is able to access the session context and thus provide continuity of service for the session. When a NF consumer requests creation of a new session context, the NF consumer may also provide a binding indication indicating alternative endpoint addresses, e.g., for callback addresses at the NF consumer for the session context. In case of failure of NF/NF Service Instance, or to perform load re-balancing, a NF can use Binding Indication to select alternative NF/NF Service Instance.

The NF consumer generally assumes that all session contexts created by the service provider prior to the time indicated by the recovery timestamp to be lost and takes appropriate action. When the failure is with a NF Instance or NF Service Instance and the binding for the session is to the NF Set or NF Service Set to which the NF Instance or NF Service Instance belongs, the NF consumer can select an alternative NF Instance or NF Service Instance from the NF Set or NF Service Set respectively to maintain continuity of the session. When the failure is with a NF Instance or NF Service Instance and the binding is to the NF Instance or NF Service Instance respectively, the NF consumer assumes that all session contexts created prior to the recovery timestamp to be lost.

The 3GPP standards specify procedures for NF/NF Service failure and restart detection. In the case where failure notification is provided by a NRF 75, the NRF 75 detects the failure based on heartbeat signaling and sends a failure notification to the subscribing NFs. When a NF Service provided by a NF Instance or NF Service Instance is restored after failure, recovery information is relayed via the NRF 75 in a restart notification from the NRF 75 to subscribing NF consumers. In the case of direct signaling between peer NFs, recovery information is conveyed in request-response (which includes subscribe-notify signaling) signaling between NFs.

3GPP has specified a restoration procedure in the event that a NF or NF Service fails. See, 3GPP TS 23.527. The restoration procedure is per NF or per NF Service Instance. When restart of a NF or a NF Service is notified via a NRF 75, a recovery time stamp is associated with either a NF in the data type NFProfile as specified in TS 29.510, 6.1.6.2.2, or a NF Service Instance in the data type NFProfile as specified in TS 29.510, 6.1.6.2.3. When restart of a NF or a NF Service provided by a NF producer (e.g., SMF 45) is notified via direct signaling between NFs as specified in TS 23.527, 6.3 and TS 29.502, 6.1.6.2.3, 6.1.6.2.9, 6.1.6.2.10, 6.1.6.2.14, the recovery is associated with a NF Service Instance. In this case, recovery timestamp comprises a date/time when the SMF service instance serving a PDU was started/restarted.

When a NF Service provided by a NF Instance or NF Service Instance is restored after a failure and recovery information is relayed via the NRF, a restart notification is provided by the NRF to subscribing CNFs. The restart notification includes a recovery timestamp indicating the time of the recovery for the failed service provider (e.g., NF Instance or NF Service Instance). When NF Service provided by a NF Instance or NF Service Instance is restored and when the recovery information is provided via direct signaling, the recovery timestamp is associated with either a NF Service Instance when it is sent from a NF producer or a consumer identifier (Consumer ID), that identifies a NF Instance when it is sent from a NF consumer.

Figure 3:
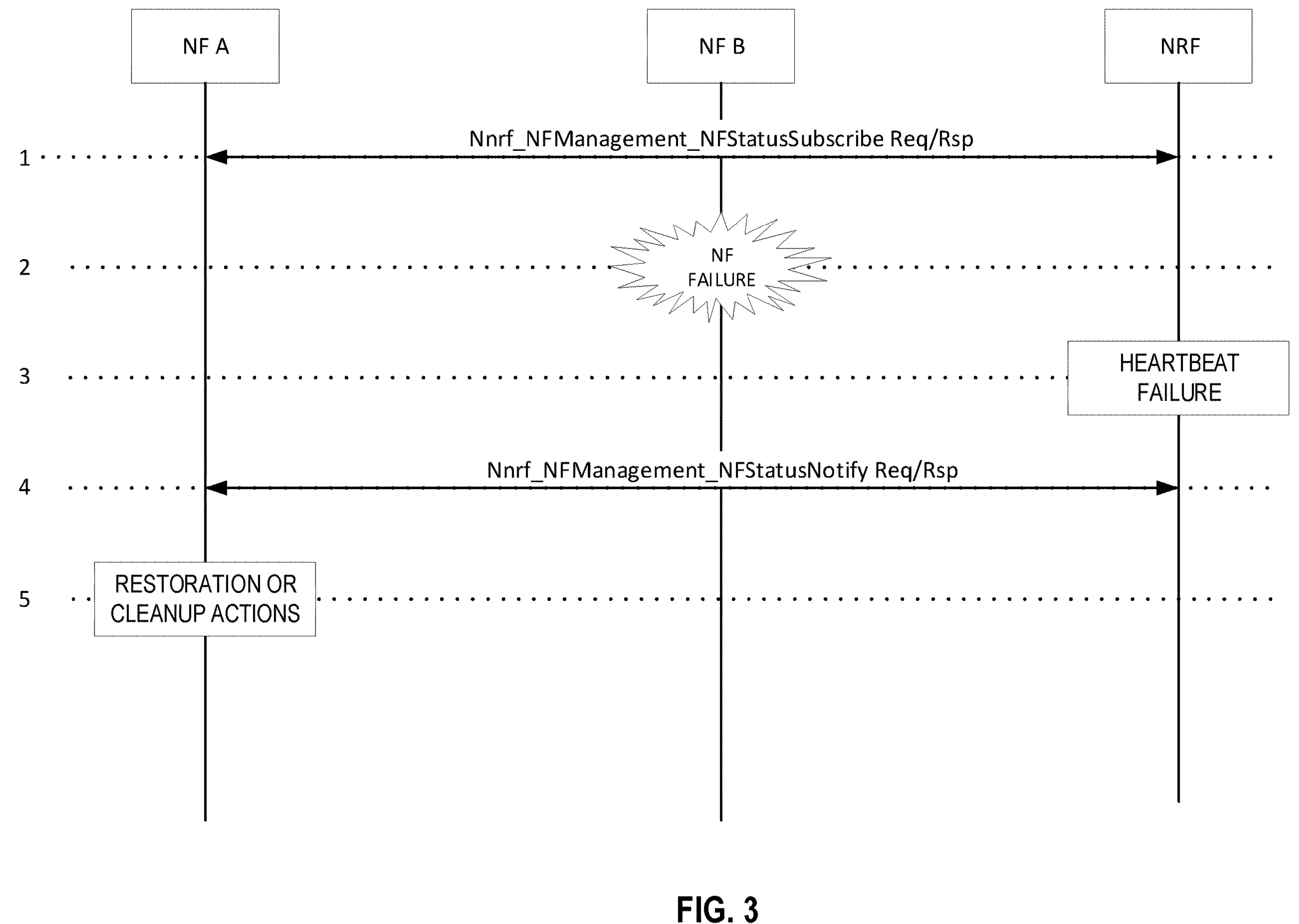
FIG. 3 is a signaling diagram illustrating NF failure detection and notification via an NRF.
Figure 4:
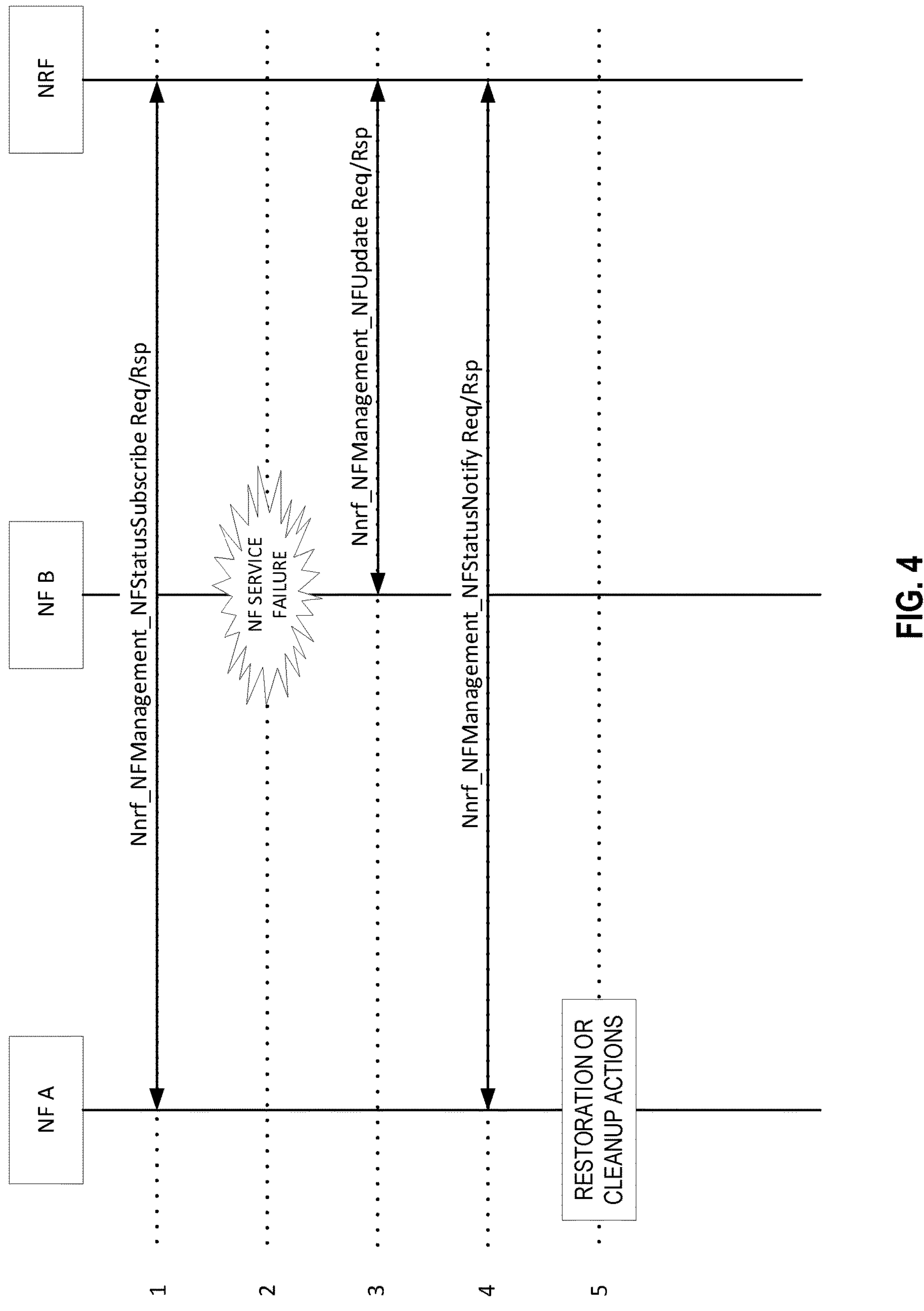
FIG. 4 is a signaling diagram illustrating NF Service failure detection and notification via an NRF.

FIGS. 3 and 4 illustrate optional procedures that may be supported by NFs to detect the failure or restart of a NF and a NF Service respectively using the NRF 75.

FIG. 3

FIG. 3 illustrates NF failure detection and notification via an NRF 75. Two NFs, denoted NF A and NF B are shown. NF A may comprise a NF producer and NF B may comprise a NF consumer, or vice versa. NF A subscribes to the NRF to receive notifications of changes of the NF B Profile, as specified in 3GPP TS 29.510 (1). Following the subscription by NF A, a NF failure occurs at NF B (2). NRF 75 detects that NF B is no longer operative using the NF heartbeat procedure as specified in 3GPP TS 29.510, 5.2.2.3.2 and changes the NFStatus of NF B to SUSPENDED (3). The NRF 75 notifies NFs having subscribed to receive notifications of changes of the NF B Profile (which includes NF A) that the NFStatus of NF B is changed to SUSPENDED (4). NF A triggers appropriate restoration or clean-up actions, if it cannot communicate with NF B (5).

FIG. 4

FIG. 4 illustrates NF Service failure detection and notification via an NRF. Two NFs, denoted NF A and NF B are shown. NF A may comprise a NF producer and NF B may comprise a NF consumer, or vice versa. NF A subscribes with the NRF 75 to receive notifications of changes of the NF B Profile (1). Following the subscription by NFA, a NF Service failure occurs at NF B (2). NF B (other than the failed NF Service) is still operative. NF B (or Operations, Administration and Management (OAM) node) updates the NF Profile of NF B in the NRF 75 by setting the NFServiceStatus of the failed NF Service to SUSPENDED (3). NRF 75 notifies NFs having subscribed to receive notifications of changes of NF B Profile (which includes NF A) that the NF Service status of the failed NF Service of NF B is changed to SUSPENDED (4). NF A triggers appropriate restoration or clean-up actions, if it cannot communicate with NF B (5).

Figure 5:
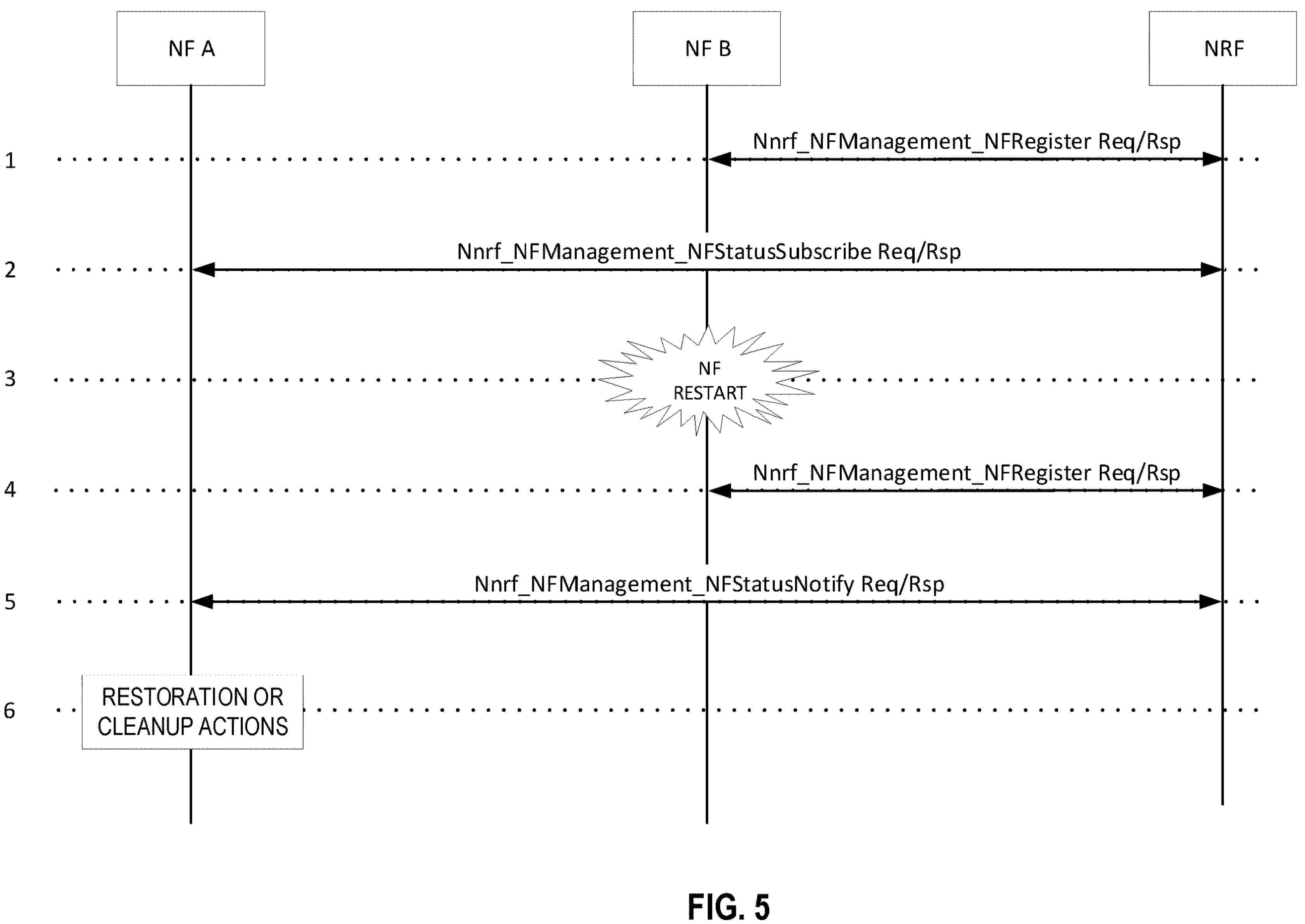
FIG. 5 is a signaling diagram illustrating NF restart detection and notification via an NRF.
Figure 6:
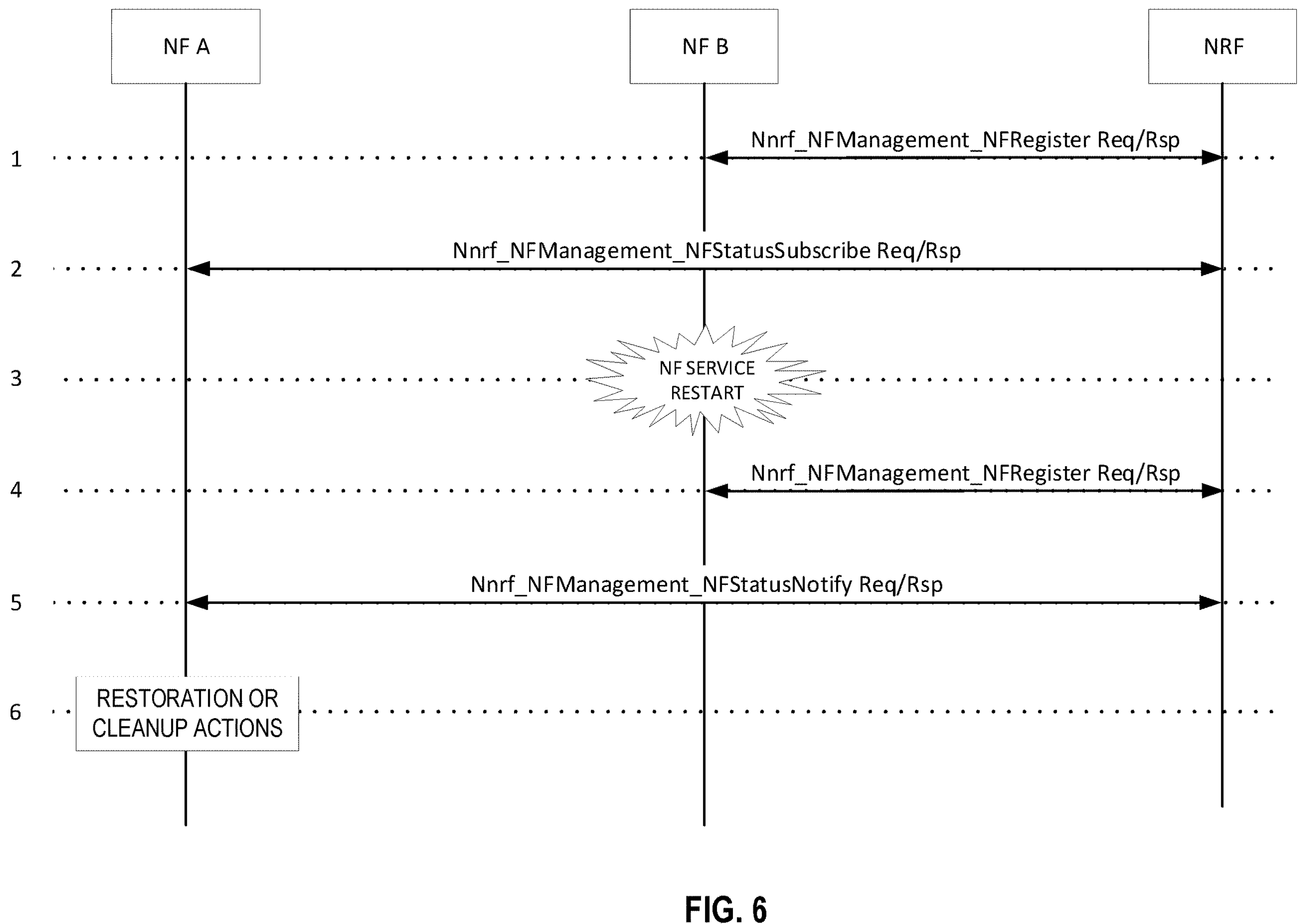
FIG. 6 is a signaling diagram illustrating NF Service restart detection and notification via an NRF.

FIGS. 5 and 6 illustrate NF restart and notification procedures via a NRF 75 to indicate the restart of a NF and a NF Service respectively using the NRF 75.

FIG. 5

FIG. 5 is a signaling diagram illustrating NF restart detection and notification via an NRF 75. Two NFs, denoted NF A and NF B are shown. NF A may comprise a NF Service provider and NF B may comprise a NF consumer, or vice versa. NF B (or OAM) registers the NF B Profile with the NRF 75 (1). The NF B Profile may include the recovery Time attribute, if a restart of NF B results in losing contexts. NF A subscribes to the NRF 75 to receive notifications of changes of the NF B Profile (2). Following the subscription by NF A, NF B restarts (3). If contexts are lost during the restart, NF B (or OAM) updates the recovery Time in the NF Profile of NF B in the NRF 75 (4). NRF 75 notifies NFs having subscribed to receive notifications of changes of NF B Profile (which Includes NF A) about the updated recovery Time of the NF B Profile (5). NF A may consider that all the resources created in the NF B before the NF B recovery time as lost. NF A triggers then appropriate restoration or clean-up actions (6).

FIG. 6

FIG. 6 illustrates NF Service restart detection and notification via an NRF 75. Two NFs, denoted NF A and NF B are shown. NF A may comprise a NF Service provider and NF B may comprise a NF consumer, or vice versa. NF B (or OAM) registers the NF B Profile (and its services) with the NRF 75 (1). The NF B Profile may include the recovery Time attribute for the NF Services it supports if a restart of a NF B service results in losing contexts. NF A subscribes to the NRF 75 to receive notifications of changes of the NF B Profile (2). Following the subscription by NF A, NF B service restarts (3). If contexts are lost during the service restart, NF B (or OAM) updates the recovery Time of the corresponding NF Service in the NRF (4). NRF 75 notifies NFs having subscribed to receive notifications of changes of the NF B Profile (which includes NF A) about the updated recoveryTime of the NF B Service (5). NF A may consider that all the resources created in the NF B service before the NF B service recovery time as have been lost. NF A triggers then appropriate restoration or clean-up actions (6).

Figure 7:
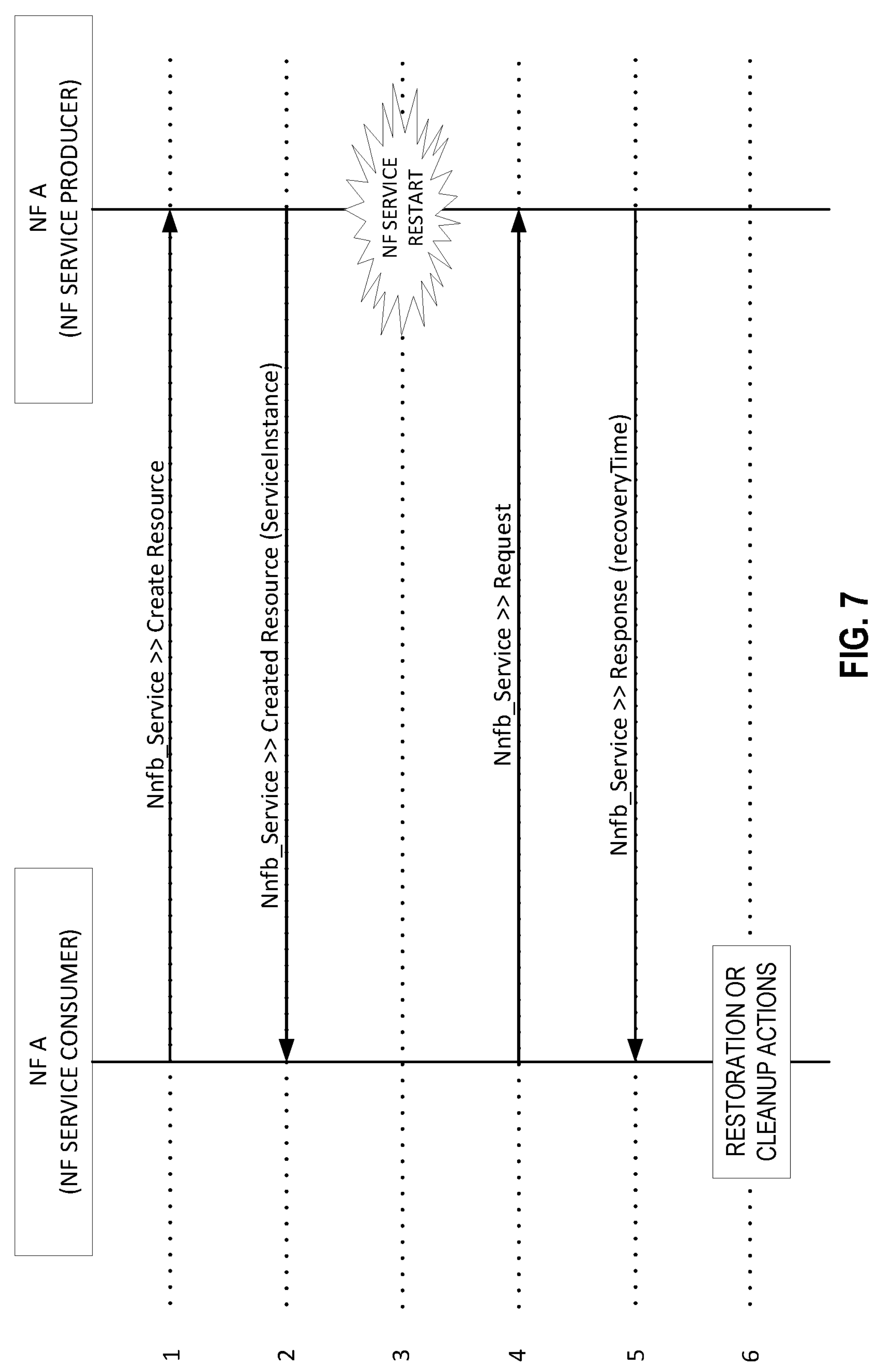
FIG. 7 is a signaling diagram illustrating NF producer service restart detection and notification via direct signaling.
Figure 8:
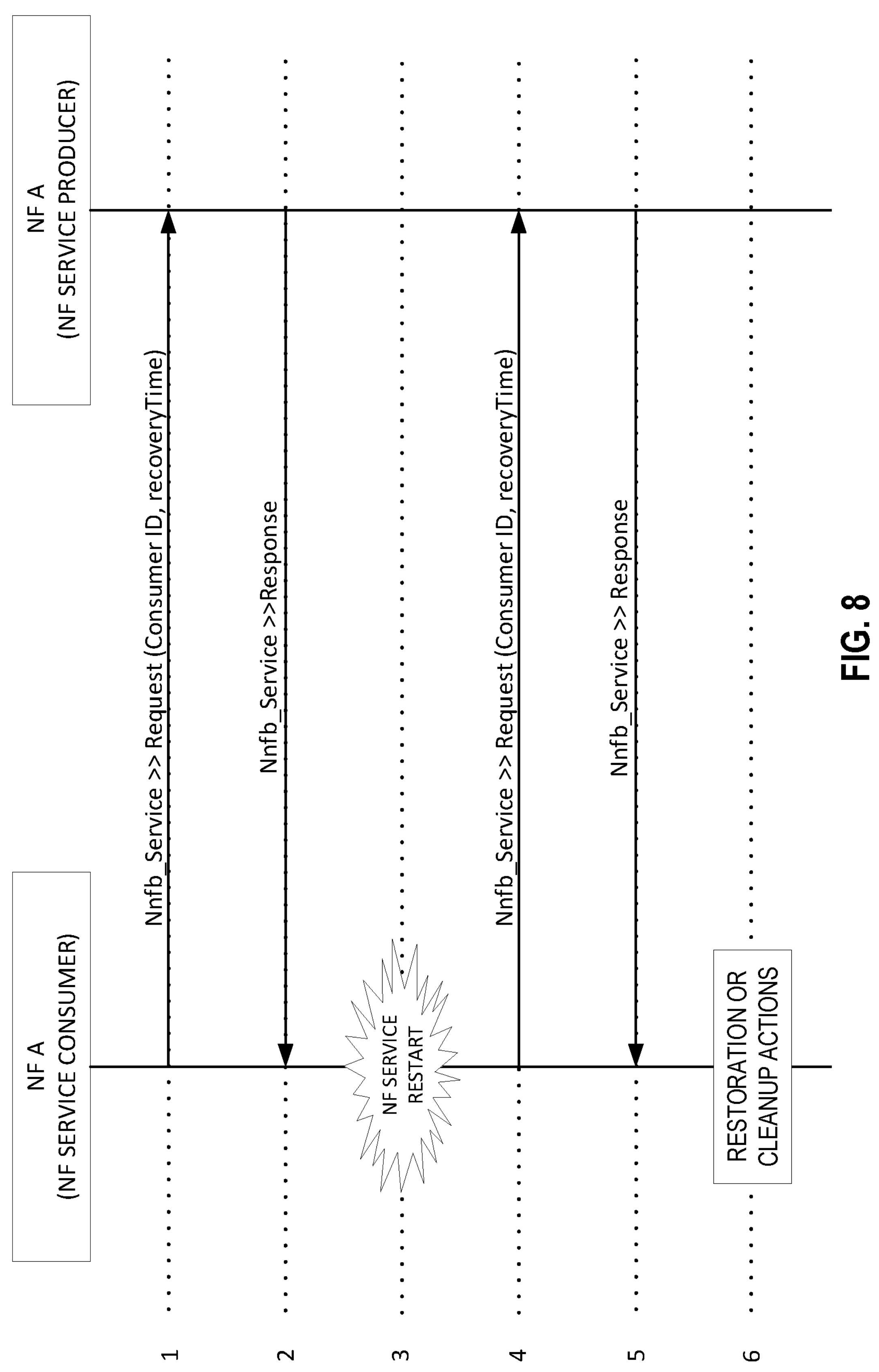
FIG. 8 is a signaling diagram illustrating NF consumer service restart detection and notification via direct signaling.

FIGS. 7 and 8 illustrate optional NF restart and notification procedures via direct signaling to indicate the restart of a NF and a NF Service respectively using the NRF 75.

FIG. 7

FIG. 7 illustrates NF producer service restart detection and notification via direct signaling. Two NFs, denoted NF A and NF B are shown. NF A is a NF Service consumer and NF B is a NF Service producer. NF A requests to create a resource in the NF B (1). If the request is accepted, NF B returns its NF B service instance ID in the response and NF A associates the created resource with the NF B Service Instance (2). A NF producer at NF B restarts (3). NF B producer may include its last recovery timestamp in responses it sends to service requests from NF A, if the restart of the NF Service resulted in losing contexts and, for example, if the NF Service has restarted recently (4-5). NF A consumer may consider that all the resources created in the NF B Service Instance before the NF B service recovery time as have been lost. NF A triggers then appropriate restoration or clean-up actions (6).

The recovery timestamp signaled in direct signaling between NFs is associated to a NF Service Instance, i.e., the same recovery timestamp shall be signaled by a NF Service Instance whatever the NF Service Instance's endpoint addresses used for the signaling.

This procedure shown in FIG. 7 may be only supported by NF Services that support signaling the recovery Time attribute. For an entire NF restart scenario, this procedure can be applied by each NF Service Instance of the NF. This procedure enables the detection of a restart of a peer NF Service when sending signaling towards that NF Service. It can fasten the detection of a restart of a peer NF Service when frequent signaling occurs towards that peer NF Service. In some use cases, NF A is not aware of the NF B service instance ID when creating the resource, e.g., a Virtual SMF (V-SMF) just receives the Home SMF (H-SMF) Uniform Resource Indicator (URI) from the AMF 40 to create a PDU session resource in H-SMF. Besides, for Application Interfaces (APIs) supporting distributed collections (e.g., SMF 45), the response can contain a different service instance ID (that need not be registered in the NRF 75) than the one selected by NF A for sending the request.

FIG. 8

FIG. 8 illustrates NF consumer service restart detection and notification via direct signaling. Two NFs, denoted NF A and NF B are shown. NF A is a NF Service consumer and NF B is a NF Service producer. NF A requests creation of a resource in NF B (1). NF A includes a Consumer ID together with the last recovery timestamp in the request. The Consumer ID should be identical for all service requests triggered by the NF consumer for that service and should be globally unique (e.g., using universally unique identifier (UUID)). If resource creation is successful, NF B, as the NF Service producer, stores the received Consumer ID and recovery timestamp and associate the created resource with it (2). Following creation of the resource for NF A, the NF Service consumer in NF A restarts (3). In this case, the NF Service consumer in NF A includes its last recovery timestamp together with the Consumer ID in the request when invoking service provided by NF B (4). The same Consumer ID is used after restarting. NF B, as NF Service producer, compares the received recovery timestamp with a previous recovery timestamp associated with the Consumer ID and detects the NF Service consumer was restarted, when the received recovery timestamp is newer than the previous one (5). The Consumer ID for the resource may be updated if another NF Service consumer took over the usage of the resource. e.g., if a new Consumer ID is received during a service operation of a resource, NF B, as NF Service producer, considers the NF Service consumer handling the resource as changed and associates the resource with the new Consumer Id and recovery timestamp. NF B may consider that the context in the NF A corresponding to all the resources associated with the Consumer ID and the previous stored recovery time stamp has been lost. NF B triggers then appropriate restoration or clean-up actions (6).

The procedure shown in FIG. 8 may be only supported by NF Services that support signaling the recovery timestamp attribute. This procedure can be used when the resource is exclusively used by a NF Service consumer to enable the detection of a restart of a peer NF consumer when sending signaling towards that NF Service producer. It is helpful if the NF A as a pure NF Service consumer without registration of its profile in NRF 75. If NF A does have a profile registered in NR 75, it also can fasten the detection of a restart of a peer NF Service consumer when frequent signaling occurs towards that peer NF Service.

When NF Set or NF Service Set (referred to collectively as NF Set/NF Service Set) is deployed, an ambiguity may arise in the case that the recovery information is relayed via the NRF 75 where the failure is with a NF/NF Service Set instance and the binding level is set to NF/NF Service Set. When the NF/NF Service Set fails, all NF Service Instances handled by the NF will also fail. Following recovery of the failed NF, a NF consumer (e.g., NF Instance or NF Service Instance) may receive a restart notification with a recovery timestamp indicating restart of one of the NF/NF Service Instances of the failed NF/NF Service Set. If the binding level is set to NF Service Set, the CNF may assume that PDU session was not lost, leaving the context hanging until the CNF needs to send a new service request to reestablish the service. The hanging context can result in disruption of service.

Another ambiguity may arise in the case where the recovery information is signaled via direct signaling, e.g., from a NF producer to the NF consumer. When the failure is with a NF Service Set, NF Instance, or NF Set and the binding level is set to NF Service Set, NF Instance or NF Set respectively, the NF producer can only populate the recovery timestamp associated with NF Service Instance. This leads the NF consumer (e.g., NF) to assume that PDU session was not lost, leaving the context hanging until the NF consumer initiates sends service request to reestablish the service. As before, the hanging context can result in disruption of service.

An aspect of the disclosure comprises enhanced communication of recovery information related to restart of a NF Service provider of NF consumer (e.g., NF Service Instance, NF Service Set, NF Instance, NF Set) when a NF Set/NF Service Set is used in the communication network 10. The failed entity may be a NF consumer, and/or a NF producer. In either case, when the NF producer/consumer fails, resources supporting a session context may be lost. The resource may be the resource in HTTP and Representational State Transfer (REST) model that refers to the session context in a server. The resource could also be software/hardware resource allocated by the NF consumer also in correspondence the session context created in the NF producer. Such recovery information (about a failure with restart) is referred to as a recovery time stamp and may be conveyed by using existing custom HTTP header "3gpp-binding-indication" with a new parameter, or a new custom HTTP header denoted herein as "3gpp-Sbi-Recovery-Time", or by including a new data type denoted recovery TimeForBinding in the message body. In any case, the recovery time stamp is associated with a NF entity in correspondence to the binding level. If the binding level included in the Binding Indication is set to Service Set, then the recovery time stamp shall be associated with the NF Service Set.

In a first embodiment, the Binding Indication HTTP header (3gpp-sbi-binding) is modified to include two new parameters/values. The modified HTTP header is shown below with the new parameters indicated by bold font.

| | |
|---|---|
| 3gpp-Sbi-Binding = "3gpp-Sbi-Binding" ":" #(OWS "bl=" blvalue 1*( OWS ";" parameter)) | |
| blvalue | = "nfinstance"/"nfset"/"nfserviceinstance"/"nfserviceset" |
| parameter | = parametername "=" token |
| parametername | = "nfinst"/"nfset"/"nfservinst"/"nfserviceset"/"servname"/ "scope"/**"recoverytimestamp"** |
| scope | = "other-service"/"callback"/"subscription-events"/**"consumer"** |

The parameter recoverytimestamp provides the recovery timestamp associated with an entity to a binding level specified in the header. The value "consumer" of the scope parameter indicates that the Binding Indication is related to the resource in a NF consumer. Also, setting the scope to callback or subscription event may be taken as an indication that the Binding Indication is related to the resource in a NF consumer. The new value "consumer" for the scope parameter may not be needed in all cases. Using the value "callback", for example, would work in most cases. However, in some scenarios, the service consumer may not provide "callback URI" in a service request message, i.e., the service producer need not to contact the service consumer. Using "callback" could be misleading, so the new value "consumer" for the scope parameter is included for this case.

Are few examples are provided below to illustrate how these new parameters/values are used.

Example 1

3gpp-Sbi-Binding: bl=nfinstance;nfinst-54804518-4191-46b3-955c-ac631f953ed8; recoverytimestamp=Tue, 4 Feb. 2020 08:49:37 GMT;

The recovery time stamp in this example corresponds to the NF instance "54804518-4191-46b3-955c-ac631f953ed8" as the binding level is NF instance.

Example 2

3gpp-Sbi-Binding: bl=nfset; nfset=set1.smfset.5gc.mnc012.mcc345; recoverytimestamp=Tue, 4 Feb. 2020 08:49:37 GMT The recovery time stamp in this example is associated with the NF Set "set1.smfset.5gc.mnc012.mcc345". The time stamp is not associated with the operated resource of the service operation.

Example 3

Example 3 illustrates a service request with two binding indications sent by a service consumer (in this example, it is a SMF 45), one is for callback requests and the other is for other services, e.g., nsmf-event-exposure service that the NF consumer may provide later as a NF producer

```
3gpp-Sbi-Binding: bl = nfinstance; nfinst = 54804518-4191-46b3-955c-
   ac631f953ed8; nfset = set1.smfset.5gc.mnc012.mcc345; servname =
nsmf-
   pdusession; recoverytimestamp = Tue, 04 Feb 2020 08:49:37 GMT;,
```

-continued

```
   bl=nfserviceset; nfservset = setxyz.snnsmf-pdusession.nfi54804518-
4191-
   46b3-955c-ac631f953ed8.5gc.mnc012.mcc345;
   nfset=set1.smfset.5gc.mnc012.mcc345; scope = other-service;
   servname = nsmf-event-exposure; recoverytimestamp = Tue, 05 Feb
2020
   08:49:37 GMT
```

In a second embodiment, a new HTTP custom header for recovery time, denoted 3gpp-sbi-recovery-time, is included in a service response for the NF producer, or in a service request for a NF consumer. An example is provided below:

```
   3gpp-Sbi-Recovery-Time = "3gpp-Sbi- Recovery-Time" ":" #(OWS timestamp*( OWS ";"
parameter))
   parameter          = parametername "=" token
   parametername      = "correlate"/"bl" /"restartedentity"
   correlate          = "true"/"false"
   bl                 = "nfinstance"/"nfset"/"nfserviceinstance"/"nfserviceset"
   restartedentity = "nfinst"/"nfset"/"nfservinst"/"nfserviceset"
```

The "correlate" parameter indicates whether the recovery time is associated with an entity in corresponding to the binding level, e.g., if the "correlate" is true and b/is set to nfinstance which is the same binding level in the 3gpp-sbi-binding-indication (included in the same message), the recovery time stamp is associated with the NF instance which is identified by nfinst (NF Instance Id) included in the 3gpp-sbi-binding-indication. When "correlate" is set to false, the recovery time stamp is associated with "restartedentity", where NF Service Instance ID, or NF Service Set ID, or NF Instance ID, or NF Set Instance ID is provided.

The following is an example where the request provides two recovery times.

3gpp-Sbi-Binding: bl=nfinstance;nfinst=54804518-4191-46b3-955c-ac631f953ed8

3gpp-sbi-recovery-time: Tue, 4 Feb. 2020 08:49:37 GMT; bl=nfinstance; correlate=true 3gpp-sbi-recovery-time: Tue, 3 Feb. 2020 010:19:25 GMT; correlate-false; restartentity=nfset=set1.smfset.5gc.mnc012.mcc345.

The request message in this example provides two recovery times, one for NF set "set1.smfset.5gc.mnc012.mcc345" and one for NF instance "54804518-4191-46b3-955c-ac631f953ed8".

In a third embodiment, an attribute denoted recovery TimeForBinding, is included in the JavaScript Object Notation (JSON) body of a service response for the NF producer, or in the JSON body (if any) of a service request for a NF consumer. The structure and usage of the attribute is similar to the HTTP custom header described above. An example is provided below.

```
recoveryTimeForBinding (array) of object
{
   "timeStamp" = timeStampValue (string);
   "correlate" = true/false (boolean);
   "bl" = "nfinstance"/"nfset"/"nfserviceinstance"/"nfserviceset" (enumeration);
   "restartedentity"= "nfinst"/"nfset"/"nfservinst"/"nfserviceset"
}
```

The usage of each child information element (IE) is identical to the description of the HTTP custom header.

The proposed restart notifications enables a NF to correctly to populate a failure with restart which may be related to a NF Service, a NF Service Set, a NF Instance or a NF Set in 5GC 30 when a NF/NF Service Set is deployed in the communication network 10.

Figure 9:
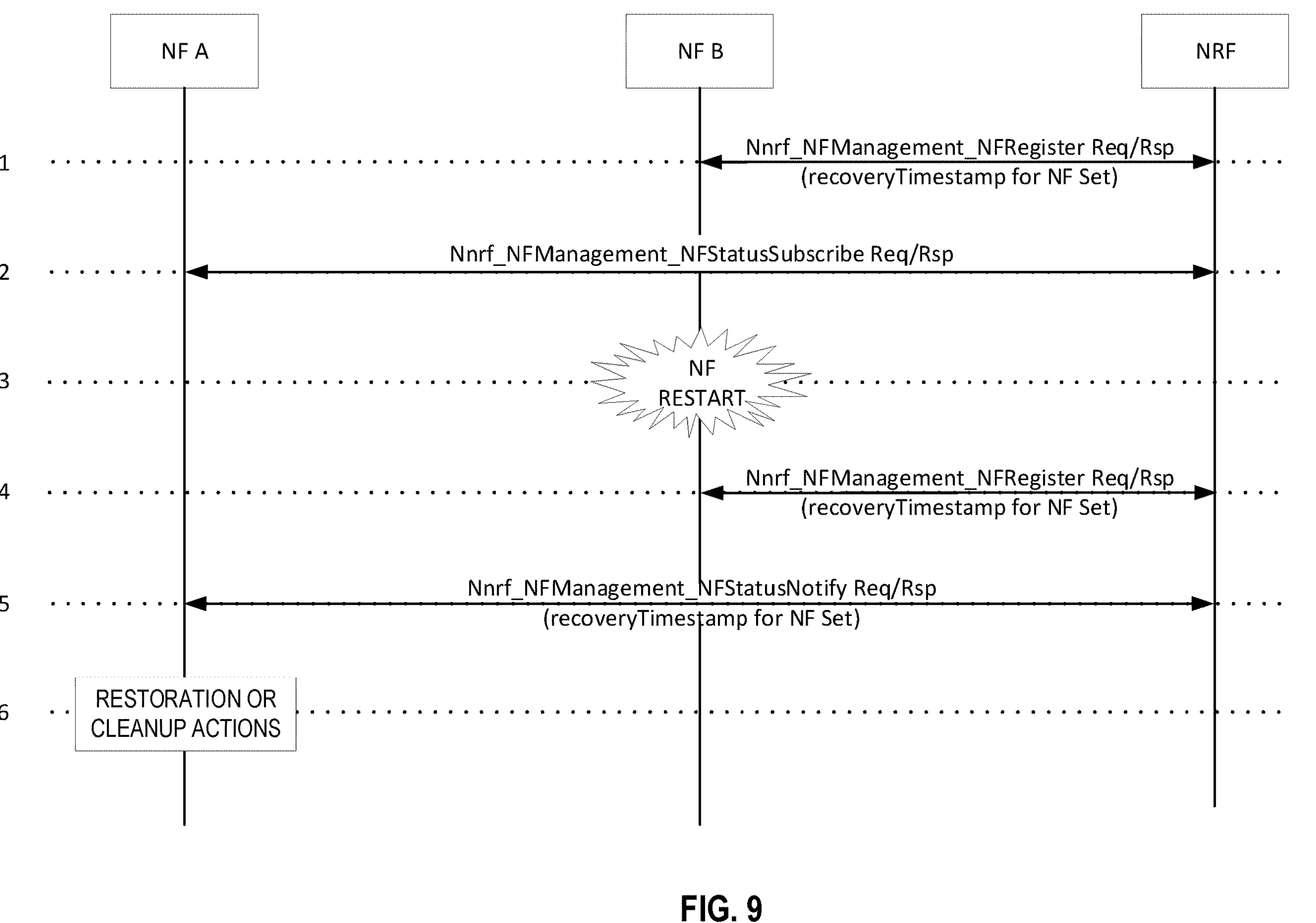
FIG. 9 is a signaling diagram illustrating enhanced NF restart detection and notification for a NF Set via an NRF.
Figure 10:
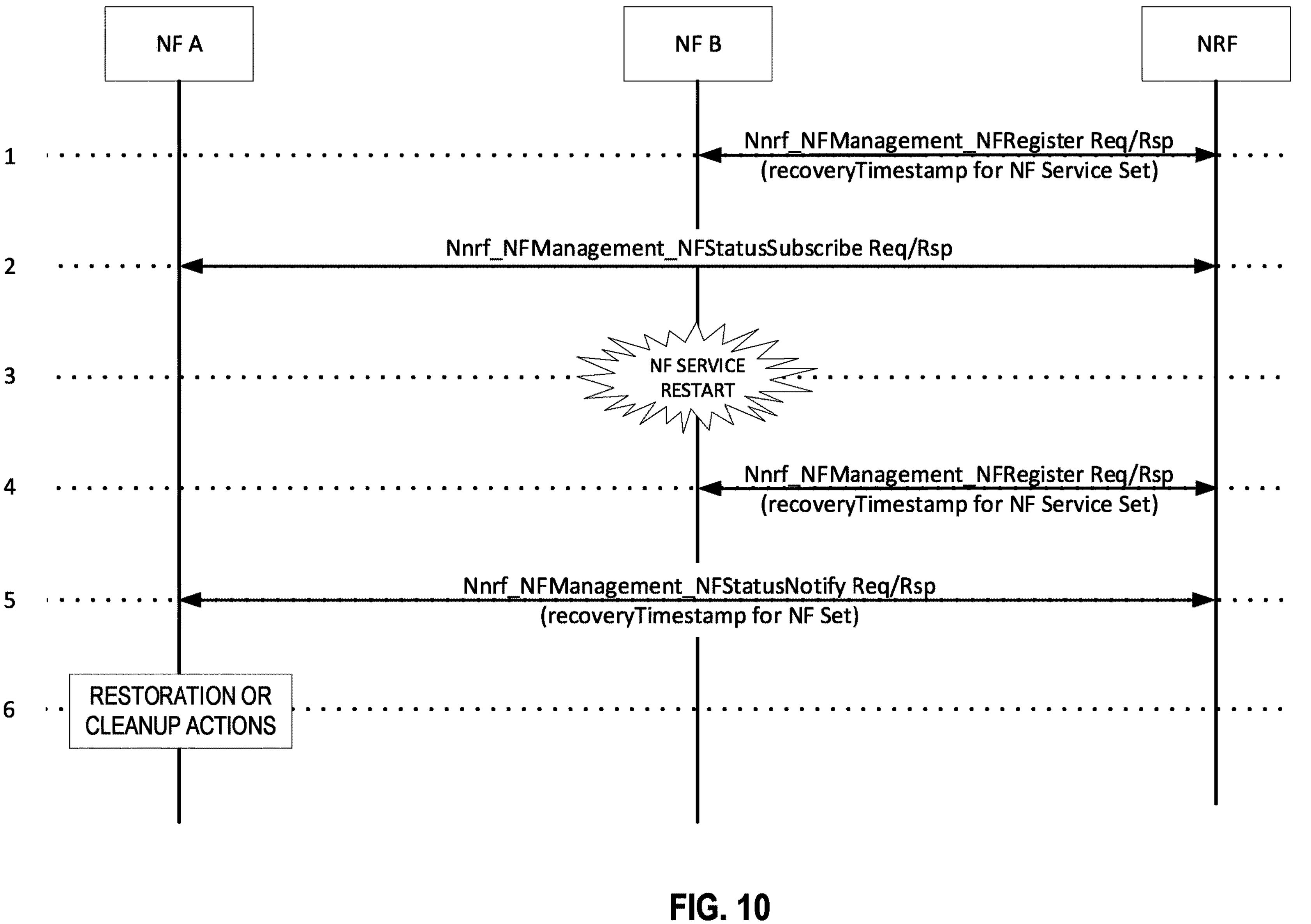
FIG. 10 is a signaling diagram illustrating enhanced NF restart detection and notification for a NF Service Set via an NRF.

FIGS. 9 and 10 illustrate enhanced restart and notification procedures via a NRF 75 to indicate the restart of a NF and a NF Service respectively using the NRF 75.

FIG. 9

FIG. 9 illustrates enhanced NF restart detection and notification for a NF Set via an NRF 75. NF A may comprise a NF producer and NF B may comprise a NF consumer, or vice versa. This procedure is similar to the detection and restart notification procedure in FIG. 5. It is assumed that NF B has previously registered with the NRF 75, NF A has subscribed to receive notifications of changes of the NF B Profile (2), and that NF B has since restarted (3). During the registration/update of the NF B Profile in (1), NF-B may include a recovery Time attribute associated with the NF Set to which the NF producer/consumer in NF-B belongs. Following the restart, NF B updates its NF B Profile with the NRF 75 (4) to include a new recovery Time attribute associated with the NF Set to which NF-B belongs when the binding level of a session supported by NF producer/consumer is set to NF Set (4). NRF 75 notifies NFs having subscribed to receive notifications of changes of NF B Profile (which Includes NF A) about the updated recoveryTime of the NF B Profile (5). The notification may include the recoverytime attribute associated to the NF Set to which NF B belongs. NF A may consider that all the resources created in the NF B before the NF B recovery time as have been lost. NF A triggers then appropriate restoration or clean-up actions (6).

FIG. 10

FIG. 10 is a signaling diagram illustrating enhanced NF restart detection and notification for a NF Service Set via an NRF. NF A may comprise a NF Service provider and NF B may comprise a NF consumer, or vice versa. NF B (or OAM) registers NF B Profile to the NRF 75. This procedure is similar to the detection and restart notification procedure in FIG. 6. It is assumed that NF B has previously registered with the NRF 75, NF A has subscribed to receive notifications of changes of the NF B Profile (2), and that NF B has since restarted (3). During the registration/update of the NF B Profile in (1), NF-B may include a recoveryTime attribute associated with the NF Service Set to the NF producer/consumer in NF-B belongs. Following the restart, NF B updates its NF B Profile with the NRF 75 (4) to include a new recovery Time attribute associated with the NF Service Set to which NF producer/consumer in NF-B belongs when the binding level of a session supported by NF producer/consumer is set to NF Set (4). NRF 75 notifies NFs having subscribed to receive notifications of changes of the NF B Profile (which includes NF A) about the updated recoveryTime of the NF B Service (5). The notification may include the recoverytime attribute associated to the NF Set to which NF B belongs. NF A may consider that all the resources created in the NF B service before the NF B service recovery time as have been lost. NF A triggers then appropriate restoration or clean-up actions (6).

Figure 11:
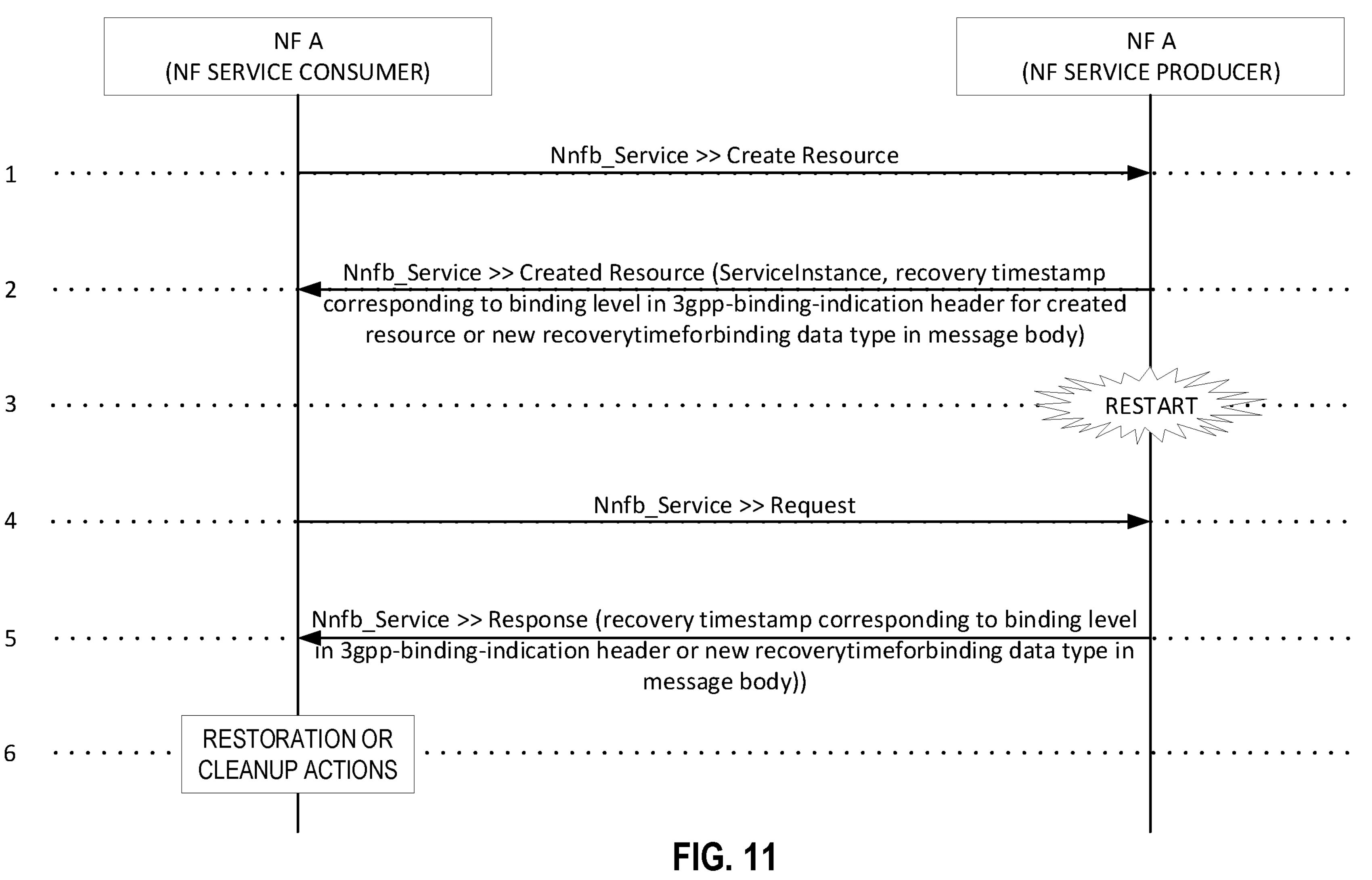
FIG. 11 is a signaling diagram illustrating enhanced NF Service restart detection and notification via direct signaling between a NF producer and NF consumer.
Figure 12:
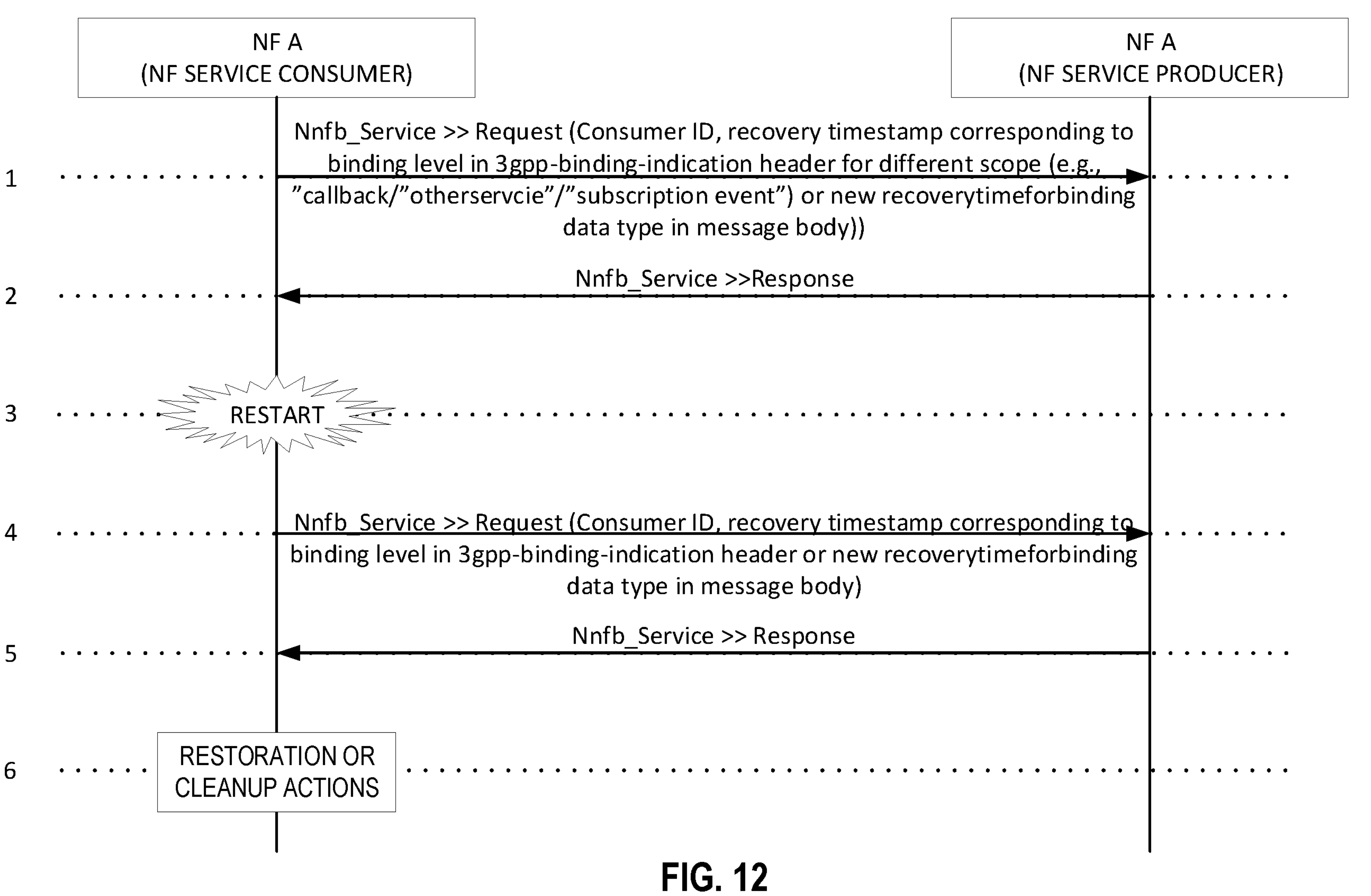
FIG. 12 is a signaling diagram illustrating enhanced NF Service restart detection and notification via direct signaling between a NF consumer and NF Service provider.

FIGS. 11 and 12 illustrate enhanced restart and notification procedures implemented by a network node to indicate the restart of a NF producer and a NF consumer respectively via direct signaling. As used herein, a network node comprises equipment (e.g., processing resources and memory) used to implement a NF.

FIG. 11

FIG. 11 illustrates enhanced NF Service restart detection and notification for a failed NF producer via direct signaling between a NF Service consumer and NF Service producer. This procedure is similar to the detection and restart notification procedure in FIG. 7. NF A requests to create a resource in the NF B (1). If the request is accepted, NF B returns its NF B service instance ID in the response and NF A associates the created resource with the NF B Service Instance (2). The service response includes a recovery timestamp corresponding to the binding level specified in the 3gpp-binding-indication HTPP header for the created resource. Alternatively, a new data type denoted recoverytimeforbinding is included in the message body that contains a recovery timestamp associated with the binding level for the created resource. A NF Service produced by NF B restarts (3). Thereafter, when NF-B receives a service request from NF-A, NF B service may include its last recovery timestamp in its responses the NF consumer, if the restart of the NF Service resulted in losing contexts and e.g., if the NF Service has restarted recently (4-5). The recovery timestamp is associated with the binding level for the created resource. The recovery timestamp may be included in "3gpp-binding-indication" HTTP header or in a new data type denoted recoverytimeforbinding in the message body. NF A may consider that all the resources created in the NF B Service Instance before the NF B service recovery time as have been lost. NF A triggers then appropriate restoration or clean-up actions (6).

FIG. 12

FIG. 12 illustrates enhanced NF Service restart detection and notification for a failed NF consumer via direct signaling between a NF Service consumer and NF Service producer. This procedure is similar to the detection and restart notification procedure in FIG. 8. NF A requests to create a resource in the NF B (1). NF A includes a Consumer ID together with the last recovery timestamp in the request. The recovery timestamp is associated with the binding level specified in the "3gpp-binding-indication" HTPP header for the associated resource where the scope is callback, other service, or subscription events. Alternatively, a new data type denoted recoverytimeforbinding is included in the message body that contains at least a recovery timestamp associated with the binding level for callback. It is assumed in this case that the binding level is NF Instance. If resource creation is successful, NF B as NF producer indicates the success in its response and stores the received Consumer ID and recovery timestamp and associates the created resource with it (2). Following creation of the resource for NF A, the NF consumer in NF A restarts (3). In this case, the NF consumer in NF A includes its last recovery timestamp together with the Consumer ID in the request when invoking service provided by NF B (4). The recovery timestamp is associated with the binding level for the created resource. The recovery timestamp may be included in "3gpp-binding-indication" HTTP header or in a new data type denoted recoverytimeforbinding in the message body. The same Consumer ID is used after restarting. NF B as NF producer compares the received recovery timestamp with a previous recovery timestamp associated with the Consumer ID and detects the NF consumer was restarted, when the received recovery timestamp is newer than the previous one (5). The Consumer ID for the resource may be updated if another NF consumer took over the usage of the resource. e.g., if a new Consumer ID is received during a service operation of a resource, NF B as NF producer shall consider the NF consumer handling the resource has changed and associate the resource with the new consumer Id and recovery timestamp. NF B may consider that the context in the NF A corresponding to all the resources associated with the Consumer ID and the previous stored recovery time stamp has been lost. NF B triggers then appropriate restoration or clean-up actions (6).

FIG. 13

Figure 13:
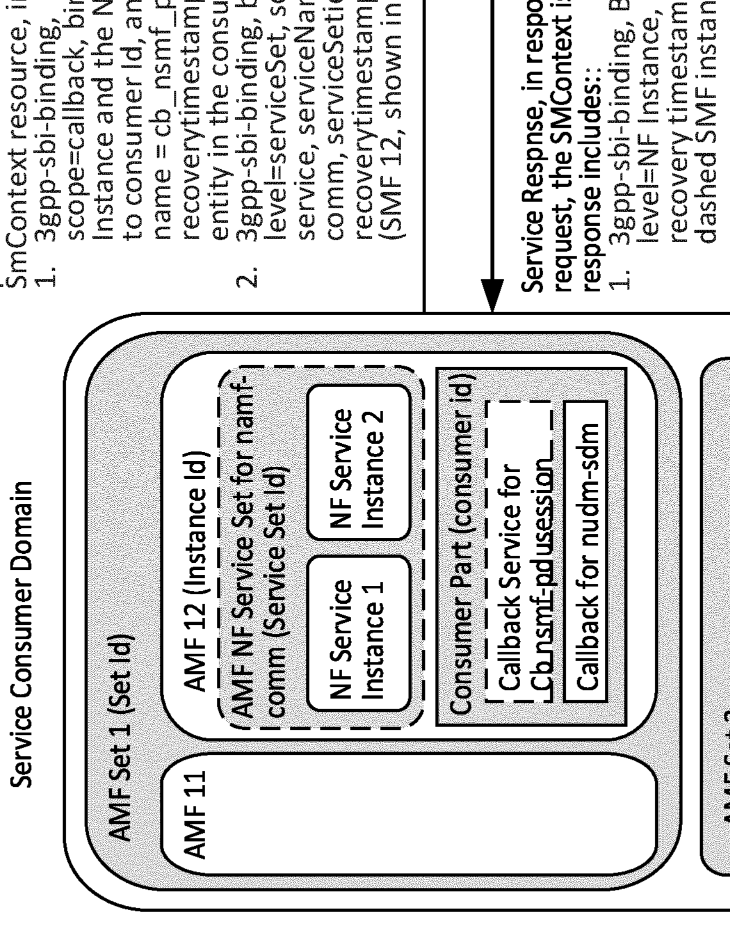
FIG. 13 illustrates an example of enhanced restart detection and notification implemented by an AMF and SMF.

FIG. 13 illustrates communication of recovery information between an AMF 40 and SMF 45 in the context of PDU session establishment. FIG. 13 shows two AMF sets on the left (consumer domain) denoted AMF Set 1 and AMF 2 respectively and two SMF sets on the right (producer domain) denoted SMF Set 1 and SMF 2 respectively.

AMF Set 1 includes two instances of an AMF denoted AMF 11 and AMF 12 respectively. AMF 12 is divided into a consumer part and producer part. The producer part includes a NF Service Set for namf communication (namf-comm) services with two NF Service Instances denoted NF Service Instance 1 and NF Service Instance 2 respectively. The consumer part includes a service set providing two custom services, one is for callback of nsmf-pdusession services, denoted cb-nsmf-pdusession, and the other is for callback of nudm-sdm services, named cb-nudm-sdm.

SMF Set 1 includes two instances of an SMF denoted SMF 11 and SMF 12 respectively. SMF 12 is divided into a consumer part and producer part. The producer part includes a NF Service Set providing nsmf-pdusession services with two NF Service Instances denoted NF Service Instance 1 and NF Service Instance 2 respectively. The consumer part includes a service set providing two custom services, one is for callback of namf-comm services, denoted cb-namf-comm, and the other is for callback of nudm-sdm services, denoted cb-nudm-sdm.

In the following example, it is assumed that AMF 12 needs to establish a PDU session for a UE 15 served by AMF 12. Inn this example, AMF 12 is a NF consumer and SMF 12 is a NF producer. AMF 12 invokes the nsmf-pdusession service towards SMF 12 by sending the service request message containing a custom HTTP header called "3gpp-sbi-binding", where the scope is set to "callback" and the binding level=ServiceSet. The NF Instance identifier and the Service Set identifer is included. In this example, the NF Service Set Identifier is set to Consumer ID and the service name is cb_nsmf_pdusession. The service request further includes a recovery timestamp. In this case, the recovery time stamp is associated with the entity corresponding to the binding level "ServiceSet" and points to a specific service cb-pdusession in the consumer part of AMF 12. In this example, the session context for the PDU session resource allocated in the service consumer is associated with a recovery time stamp. If the recovery time stamp is incremented, this will indicate to the receiver that the session contexts created for the cb-pdusession service are lost.

In the same message, the AMF 12 includes another a custom HTTP header called "3gpp-sbi-binding", where binding level=ServiceSet, scope=other service, serviceName=namf-comm. The service request message also includes serviceSetid and a recovery timestamp. In this case, the recovery time stamp is associated with the entity corresponding to the binding level "ServiceSet" for the namf-comm service.

In this example, it is assumed that the service request from AMF 12 is accepted and that a session context is created SMF 12. Two example response are shown. The first EXAMPLE response from SMF 12 contains a custom HTTP header called "3gpp-sbi-binding", where the binding level is "NF Instance" for the nsmf-pdusession service and includes a recovery time stamp. In this case, the included a recovery timestamp time stamp is associated with the entity in corresponding to the binding level "NF Instance" for the nsmf-pdusession service in the producer part of SMF 12. In this case, the session context for the PDU session resource allocated in the service producer is associated with the recovery time stamp is associated. If the recovery time stamp is incremented, this will indicate to the receiver that the session contexts handled by the NF Service Set are lost.

In the second example response from SMF 12 response contains a custom HTTP header called "3gpp-sbi-binding", where the binding level is "NF Instance" for the nsmf-pdusession service and includes a recovery time stamp. In this case, the included a recovery timestamp time stamp is associated with the entity in corresponding to the binding level "NF Set" for the nsmf-pdusession service. In this case, the session context for the PDU session resource allocated in the service producer is associated with the recovery time stamp is associated. If the recovery time stamp is incremented, this will indicate to the receiver that the session contexts handled by the NF Instance denoted as SMF 1 are lost.

FIG. 14

Figure 14:
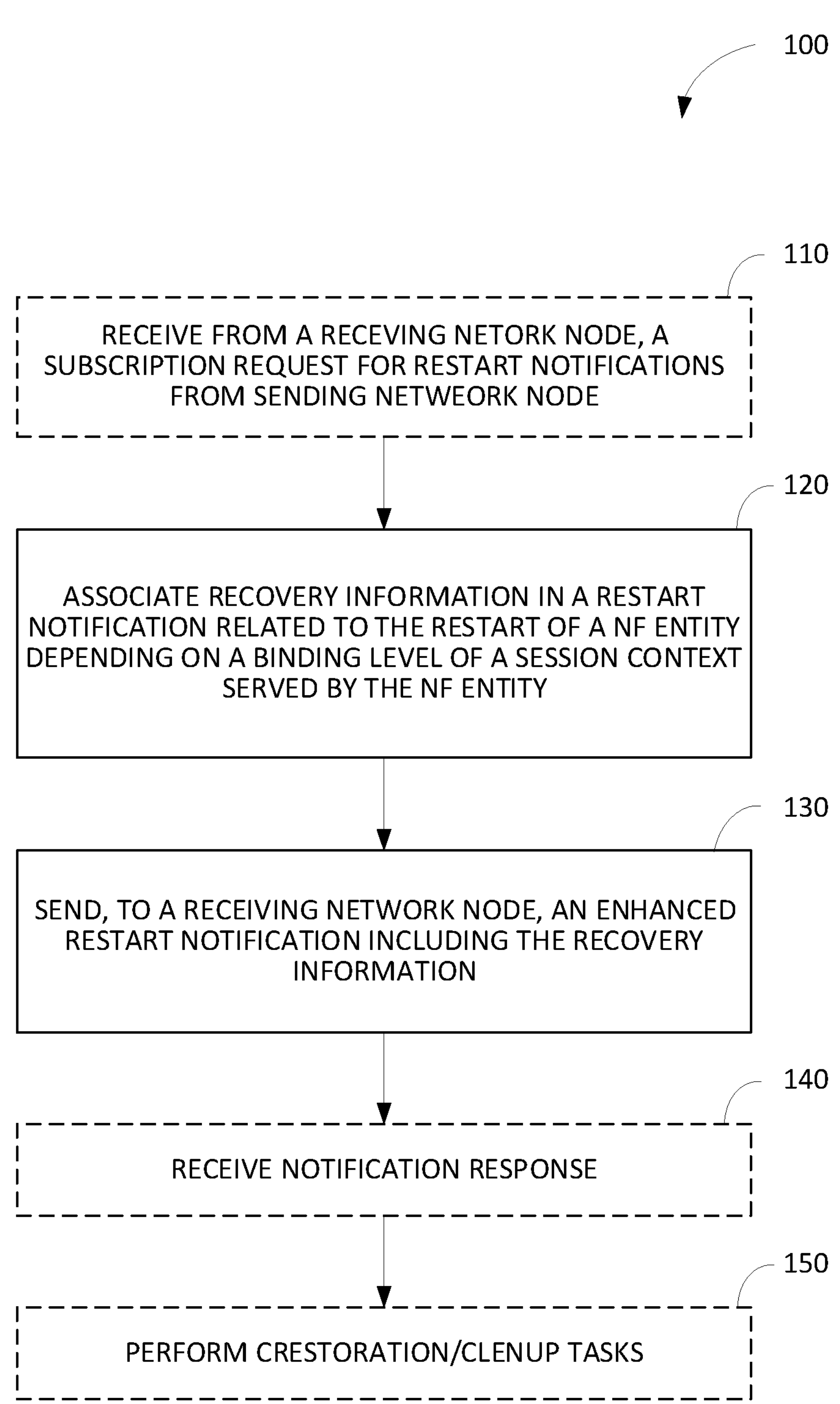
FIG. 14 illustrates a method of enhanced restart detection and notification implemented by a sending network node.

FIG. 14 illustrates a method 100 implemented by a sending network node 300 (FIG. 16) in a communication system 10 of signaling a recovery time in a restart notification. The sending network node 300 may comprise a producer network node or a consumer network node. In some embodiment, the sending network node 300 may receive a request from a receiving network node requesting restart notifications from the sending network node (block 110). The method 100 comprises, when a restart notification is triggered, associating recovery information in a restart notification related to the restart of a network function entity depending on a binding level of a session served by the NF entity (block 120). The method 100 further comprises sending, to a receiving network node, an enhanced restart notification including the recovery information (block 130). In some embodiments, the sending network node receives a notification response message from the receiving network node acknowledging the restart notification (block 140) and performs restoration/cleanup operations responsive to the notification response message (block 150).

In some embodiments of the method 100, the enhanced recovery information comprises an enhanced recovery timestamp associated with the binding level of the session served by the NF entity.

In some embodiments of the method 100, the associating comprises determining the binding level of a session served by the NF entity and associating the determined binding level with the enhanced recovery information.

In some embodiments of the method 100, the NF entity comprises a NF producer or a NF consumer.

In some embodiments of the method 100, the NF entity comprises one of a NF Service Instance, NF Service Set, NF Instance or NF Set.

In some embodiments of the method 100, the entity is identified by a consumer identifier together with a custom service. In some cases, the consumer identifier identifies a NF Instance or NF Service Set.

In some embodiments of the method 100, the binding level for the session context is a NF Set and the enhanced restart notification is sent responsive to the restart of the NF entity.

In some embodiments of the method 100, the NF entity comprises a NF Service Instance.

In some embodiments of the method 100, the binding level for the session context is a NF Service Set and the enhanced restart notification is sent responsive to the restart of the NF Service Set.

In some embodiments of the method 100, the enhanced restart notification is inserted into one of a service request message, service response message, subscription request message, or notification message.

In some embodiments of the method 100, the enhanced restart notification comprises a recovery timestamp information element in a header of the service request message, service response message, subscription request message, or notification message.

In some embodiments of the method 100, the enhanced restart notification comprises a recovery timestamp information element in a message body of the service request message, service response message, subscription request message, or notification message.

In some embodiments of the method 100, wherein the enhanced restart notification is sent to a network repository function in a registration request or registration update message.

In some embodiments of the method 100, the enhanced restart notification is sent to a consumer network node or producer network node in a service request message.

FIG. 15

Figure 15:
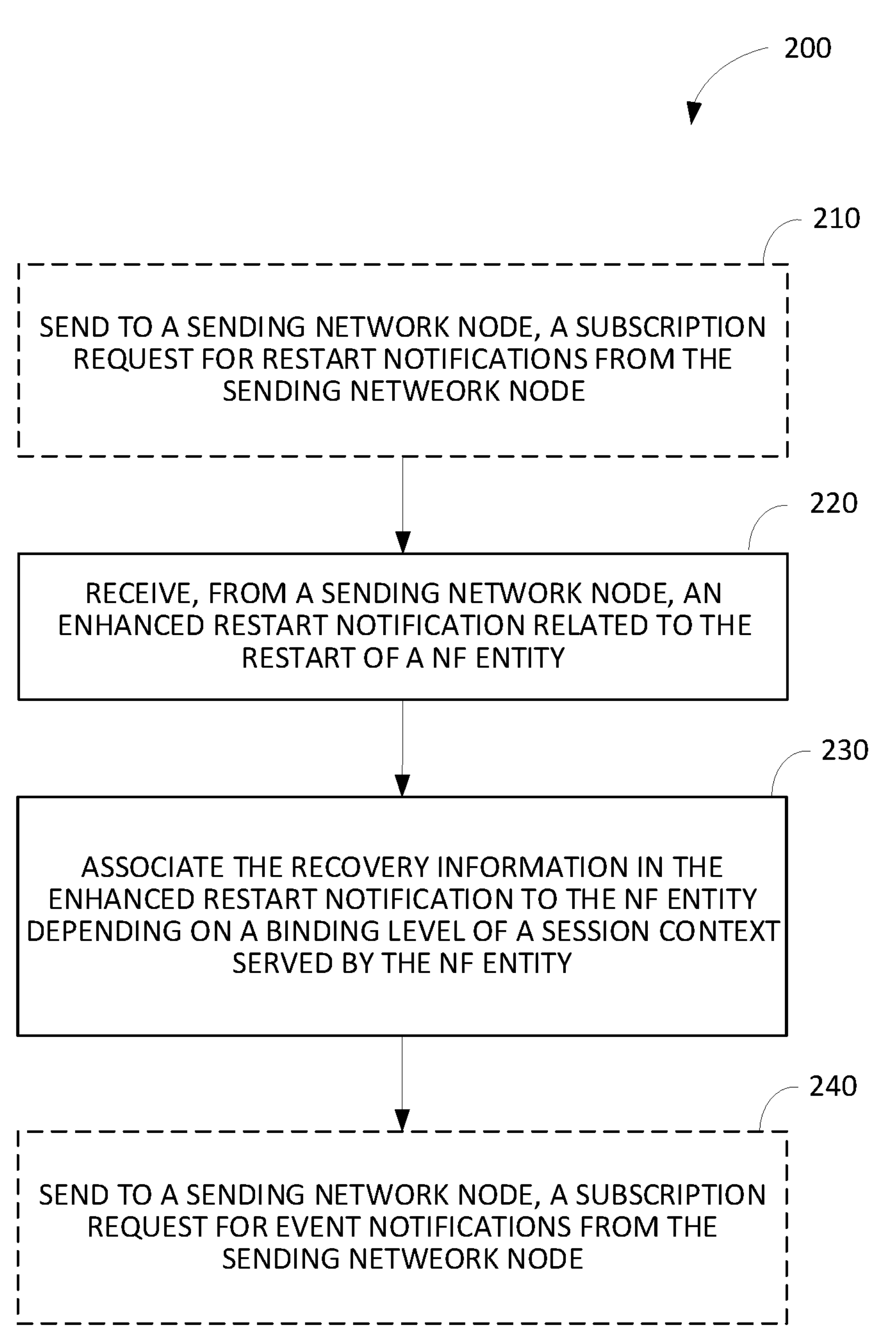
FIG. 15 illustrates a method of enhanced restart detection and notification implemented by a receiving network node.

FIG. 15 illustrates a method 200 implemented by a receiving network node 400 (FIG. 17) in a communication system 10 of receiving enhanced restart notifications from a sending network node. The receiving network node 400 may comprise a producer network node or a consumer network node. In some embodiment, the receiving network node 300 sends a request to the sending network node requesting restart notifications from the sending network node (block 210). The method 100 comprises receiving, from a sending network node, an enhanced restart notification related to the restart of a NF entity (block 220). The method further comprises associating the recovery information in the enhanced restart notification to the NF entity depending on a binding level of a session context served by the NF entity (block 230).

In some embodiments, the receiving network node 400 sends a response message to the sending network node answering the restart notification (block 240).

In some embodiments of the method 200, the enhanced recovery information comprises an enhanced recovery timestamp associated with the binding level of the session served by the NF entity.

In some embodiments of the method 200, the associating comprises determining the binding level of a session served by the NF entity and associating the determined binding level with the enhanced recovery information.

In some embodiments of the method 200, the NF entity comprises a NF producer or a NF consumer.

In some embodiments of the method 200, the NF entity comprises one of a NF Service Instance, NF Service Set, NF Instance or NF Set.

In some embodiments of the method 200, the entity is identified by a consumer identifier together with a custom service. In some cases, the consumer identifier identifies a NF Instance or NF Service Set.

In some embodiments of the method 200, the binding level for the session context is a NF Set and the enhanced restart notification is sent responsive to the restart of the NF entity.

In some embodiments of the method 200, the NF entity comprises a NF Service Instance.

In some embodiments of the method 200, the binding level for the session context is a NF Service Set and the enhanced restart notification is sent responsive to the restart of the NF Service Set.

In some embodiments of the method 200, the enhanced restart notification is inserted into one of a service request message, service response message, subscription request message, or notification message.

In some embodiments of the method 200, the enhanced restart notification comprises a recovery timestamp information element in a header of the service request message, service response message, subscription request message, or notification message.

In some embodiments of the method 200, the enhanced restart notification comprises a recovery timestamp information element in a message body of the service request message, service response message, subscription request message, or notification message.

In some embodiments of the method 200, the enhanced restart notification is received from a network repository function in a registration request or registration update message.

In some embodiments of the method 200, the enhanced restart notification is received from a consumer network node or producer network node in a service request message.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

FIG. 16

Figure 16:
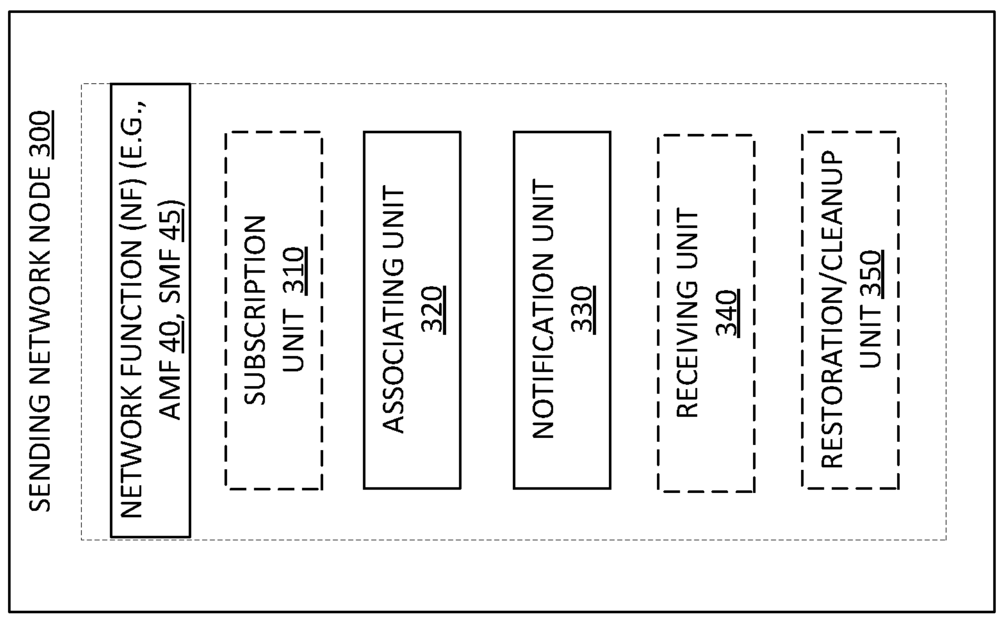
FIG. 16 illustrates a sending network node configured for enhanced restart detection and notification.

FIG. 16 illustrates an exemplary sending network node 300 configured to perform the method 100 shown in FIG. 14. The sending network node 300 comprises an optional subscription unit 310, an associating unit 320, a notification unit 330, an optional receiving unit 340, and an optional cleanup unit 350. The various units 310-350 are part of a PNF or CNF, such as an AMF 40 or SMF 45. The various units 310-350 can be implemented by hardware and/or by software code that is executed by a processor or processing circuit. The subscription unit 310, when present, is configured to receive a request from a receiving network node 400 requesting restart notifications from the sending network node 300. The associating unit 320 is configured to associate recovery information in a restart notification related to the restart of a NF entity depending on a binding level of a session context served by the NF entity. The notification unit 330 is configured to send, to a receiving network node, an enhanced restart notification including the recovery information. The receiving unit 340, when present, is configured to receive a response message from the receiving network node answering the restart notification. The cleanup unit 350, when present, is configured to perform cleanup operations responsive to the response message.

FIG. 17

Figure 17:
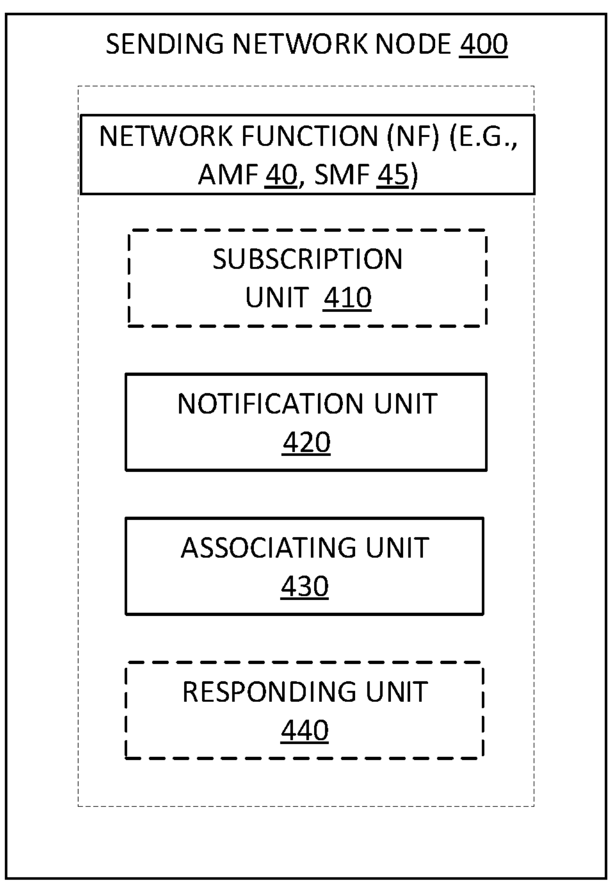
FIG. 17 illustrates a receiving network node configured for enhanced restart detection and notification.

FIG. 17 illustrates an exemplary receiving network node 400 configured to perform the method 200 shown in FIG. 15. The receiving network node 400 comprises an optional subscription unit 410, a notification unit 420 and an optional responding unit 430. The various units 410-440 are part of a PNF or CNF, such as an AMF 40 or SMF 45. The various units 410-440 can be implemented by hardware and/or by software code that is executed by a processor or processing circuit. The subscription unit 410, when present, is configured to send a request to a sending network node 300 requesting event notifications from the sending network node 300. The notification unit 420 is configured to receive, from a sending network node, an enhanced restart notification related to the restart of a entity. The associating unit 430 is configured to associate the recovery information in the enhanced restart notification to the NF entity depending on a binding level of a session context served by the NF entity. The responding unit 440, when present, is configured to send a response message to the sending network node 300 answering the restart notification.

FIG. 18

Figure 18:
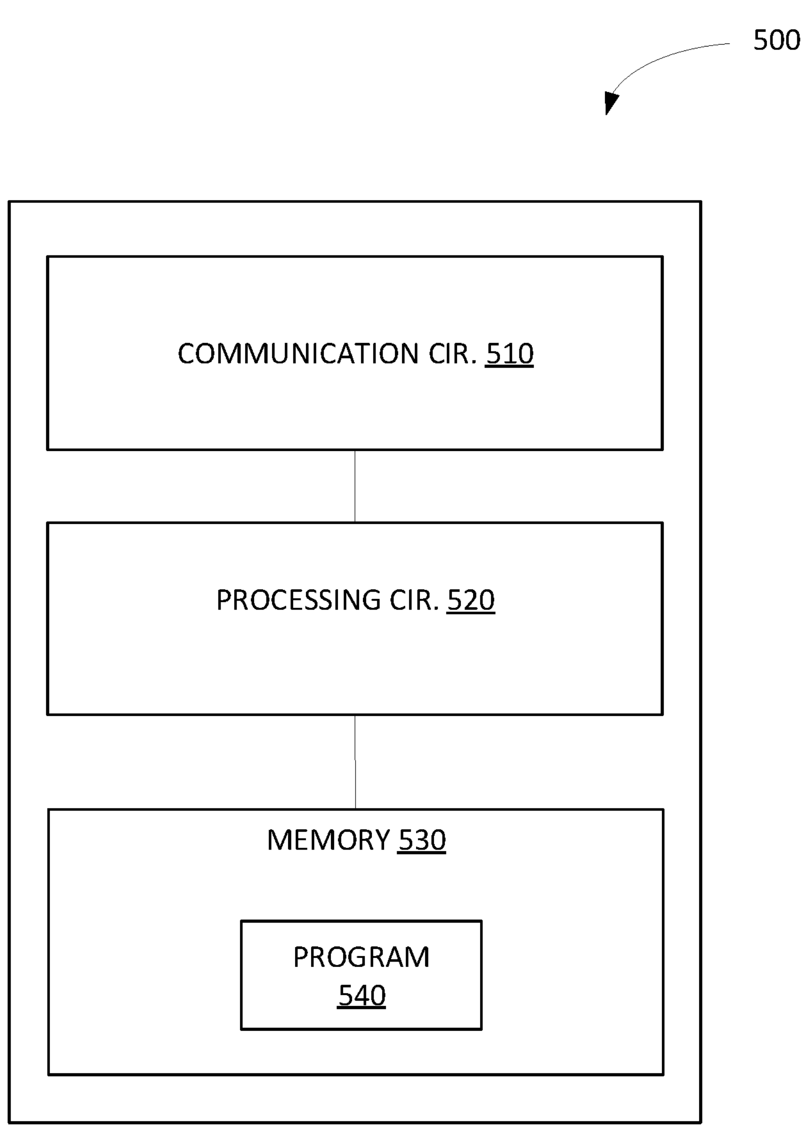
FIG. 18 illustrates a network node configured for enhanced restart detection and notification

FIG. 18 illustrates the main functional components of a network node 500 that can be configured as a producer network node or consumer network node, or a combination thereof. The network node 500 can be configured to implement the signaling procedures and methods as herein described. The network node 500 comprises communication circuitry 510, processing circuitry 520, and memory 530.

The communication circuitry 510 comprises network interface circuitry for communicating with other core network nodes in the communication network over a communication network, such as an Internet Protocol (IP) network.

Processing circuitry 520 controls the overall operation of the network node 500 and is configured to implement the procedures shown in FIGS. 9-13. The processing circuitry 520 may comprise one or more microprocessors, hardware, firmware, or a combination thereof configured to perform one or more of the methods 100, 200 shown in FIGS. 14 and 15 respectively.

Memory 530 comprises both volatile and non-volatile memory for storing computer program code and data needed by the processing circuitry 520 for operation. Memory 530 may comprise any tangible, non-transitory computer-readable storage medium for storing data including electronic, magnetic, optical, electromagnetic, or semiconductor data storage. Memory 530 stores a computer program 540 comprising executable instructions that configure the processing circuitry 520 to implement one or more of the methods 100, 200 shown in FIGS. 14 and 15 respectively y. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 540 for configuring the processing circuitry 520 as herein described may be stored in a removable memory, such as a portable compact disc, portable digital video disc, or other removable media. The computer program 540 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The enhanced restart notification procedures as herein described enable a NF to correctly populate a failure with restart which may be related to a NF Service or a NF Service Set or a NF Instance or a NF Set, in 5GC, when NF (Service) Set is deployed in the network. The procedures can be implemented using existing procedures and messages with only slight modifications.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Some Embodiments

Some embodiments described above may be summarized in the following manner:

1. A method implemented by a sending network node in a communication system of sending an enhanced restart notification to a receiving network node, the method comprising:
   - associating recovery information in a restart notification related to the restart of a network function (NF) entity depending on a binding level of a session context served by the NF entity;
   - sending, to the receiving network node, an enhanced restart notification including the recovery information.
2. The method of embodiment 1 wherein, the enhanced recovery information comprises an enhanced recovery timestamp associated with the binding level of the session served by the NF entity.
3. The method of embodiment 1 or 2 wherein, the associating comprises determining the binding level of a session served by the NF entity and associating the determined binding level with the enhanced recovery information.

4. The method of any one of embodiment 1-3 wherein, the NF entity comprises a NF producer or a NF consumer.

5. The method of embodiment 4 wherein, the NF entity comprises one of a NF Service Instance, NF Service Set, NF Instance or NF Set.

6. The method of embodiment 5 wherein, the entity is identified by a consumer identifier together with a custom service.

7. The method of embodiment 6 wherein the consumer identifier identifies a NF Instance or NF Service Set.

8. The method of embodiment 7 wherein, the binding level for the session context is a NF Set and the enhanced restart notification is sent responsive to the restart of the NF entity.

9. The method of any one of embodiment 1-8 wherein, the NF entity comprises a NF Service Instance.

10. The method of embodiment 9 wherein, the binding level for the session context is a NF Service Set and the enhanced restart notification is sent responsive to the restart of the NF Service Set.

11. The method of any one of embodiment 1-10 wherein, the enhanced restart notification is inserted into one of a service request message, service response message, subscription request message, or notification message.

12. The method of clam 11 wherein, the enhanced restart notification comprises a recovery timestamp information element in a header of the service request message, service response message, subscription request message, or notification message.

13. The method of clam 11 wherein, the enhanced restart notification comprises a recovery timestamp information element in a message body of the service request message, service response message, subscription request message, or notification message.

14. The method of embodiment 12 or 13 wherein the enhanced restart notification is sent to a network repository function in a registration request or registration update message.

15. The method of embodiment 12 or 13 wherein the enhanced restart notification is sent to a consumer network node or producer network node in a service request message.

16. A method implemented by a receiving network node in a communication system of receiving an enhanced restart notification from a sending network node, the method comprising:

receiving, from a sending network node, an enhanced restart notification related to the restart of a network function (NF) entity; and associating the recovery information in the enhanced restart notification to the NF entity depending on a binding level of a session context served by the NF entity.

17. The method of embodiment 16 wherein, the enhanced recovery information comprises an enhanced recovery timestamp associated with the binding level of the session served by the NF entity.

18. The method of embodiment 16 or 17 wherein, the associating comprises determining the binding level of a session served by the NF entity and associating the determined binding level with the enhanced recovery information.

19. The method of any one of embodiment 16-18 wherein, the NF entity comprises a NF producer or a NF consumer.

20. The method of embodiment 19 wherein, the NF entity comprises one of a NF Service Instance, NF Service Set, NF Instance or NF Set.

21. The method of embodiment 20 wherein, the entity is identified by a consumer identifier together with a custom service.

22. The method of embodiment 21 wherein the consumer identifier identifies a NF Instance or NF Service Set.

23. The method of embodiment 22 wherein, the binding level for the session context is a NF Set and the enhanced restart notification is sent responsive to the restart of the NF entity.

24. The method of any one of embodiment 16-23 wherein, the NF entity comprises a NF Service Instance.

25. The method of embodiment 24 wherein, the binding level for the session context is a NF Service Set and the enhanced restart notification is sent responsive to the restart of the NF Service Set.

26. The method of any one of embodiment 16-25 wherein, the enhanced restart notification is inserted into one of a service request message, service response message, subscription request message, or notification message.

27. The method of clam 26 wherein, the enhanced restart notification comprises a recovery timestamp information element in a header of the service request message, service response message, subscription request message, or notification message.

28. The method of clam 26 wherein, the enhanced restart notification comprises a recovery timestamp information element in a message body of the service request message, service response message, subscription request message, or notification message.

29. The method of embodiment 27 or 28 wherein the enhanced restart notification is received from a network repository function in a registration request or registration update message.

30. The method of embodiment 27 or 28 wherein the enhanced restart notification is received from a consumer network node or producer network node in a service request message.

31. A network node in a core network of a communication network configured sending an enhanced restart notification to a receiving network node, the network node being configured to:

associate recovery information in a restart notification related to the restart of a network function NF entity depending on a binding level of a session context served by the NF entity;

send, to the receiving network node, an enhanced restart notification including the recovery information.

32. The network node of embodiment 31 further configured to perform the method of any one of embodiment 2-15.

33. A network node in a core network of a communication network configured sending an enhanced restart notification to a receiving network node, the network node comprising:

communication circuitry for communicating with an exposing network node in the communication network; and processing circuitry configured to:

associate recovery information in a restart notification related to the restart of a network function NF entity depending on a binding level of a session context served by the NF entity;

send, to the receiving network node, an enhanced restart notification including the recovery information.

34. The network node according to embodiment 33 wherein the processing circuitry is further configured to perform the method of any one of embodiment 2-15.

35. A computer program comprising executable instructions that, when executed by a processing circuit in a network node, causes the network node to perform any one of the methods of embodiment 1-15.

36. A carrier containing a computer program of embodiment 35, wherein the carrier is one of an electronic signal, optical signal, radio signal, or computer readable storage medium.

37. A network node in a core network of a communication network configured receive an enhanced restart notification to a receiving network node, the network node being configured to:

associate recovery information in a restart notification related to the restart of a network function NF entity depending on a binding level of a session context served by the NF entity;

send, to the receiving network node, an enhanced restart notification including the recovery information.

38 The network node of embodiment 37 further configured to perform the method of any one of embodiment 17-30.

39. A network node in a core network of a communication network configured receive an enhanced restart notification to a receiving network node, the network node comprising:

communication circuitry for communicating with an exposing network node in the communication network; and processing circuitry configured to:

associate recovery information in a restart notification related to the restart of a network function (NF) entity depending on a binding level of a session context served by the NF entity;

send, to the receiving network node, an enhanced restart notification including the recovery information.

40. The network node according to embodiment 39 wherein the processing circuitry is further configured to perform the method of any one of embodiment 17-30.

41. A computer program comprising executable instructions that, when executed by a processing circuit in a network node, causes the network node to perform any one of the methods of embodiment 16-32.

42. A carrier containing a computer program of embodiment 41 wherein the carrier is one of an electronic signal, optical signal, radio signal, or computer readable storage medium.

A new version of Technical Specification 3GPP TS 23.527 v.16.3.0, section 6.3.2 "NF Service Producer Restart" is attached as Appendix A.

A new version of Technical Specification 3GPP TS 23.527 v.16.3.0, section 6.2.3 "NF (NF Service) Restart" is attached as Appendix B.

A new version of Technical Specification 3GPP TS 23.527 v.16.3.0, section 6.4.2 "NF Service Consumer Restart" is attached as Appendix C.

What is claimed is:

1. A method implemented by a sending network node in a communication system of sending an enhanced restart notification to a receiving network node, the method comprising:

associating a timestamp in an enhanced restart notification related to a restart of a network function (NF) entity with a binding level of a session context served by the NF entity, wherein the binding level for the session context is a NF Service Set; and sending, to the receiving network node, the enhanced restart notification including the timestamp, wherein the enhanced restart notification is sent responsive to the restart of the NF Service Set.

2. The method of claim 1 wherein, the associating comprises determining the binding level of a session served by the NF entity and associating the determined binding level with the enhanced recovery information.

3. A method implemented by a receiving network node in a communication system of receiving an enhanced restart notification from a sending network node, the method comprising:

receiving, from a sending network node, the enhanced restart notification related to including a timestamp indicating the restart of a network function (NF) entity; and associating the timestamp in the enhanced restart notification with a binding level of a session context served by the NF entity, wherein the binding level for the session context is a NF Service Set.

4. The method of claim 3 wherein, the associating comprises determining the binding level of a session served by the NF entity and associating the determined binding level with the timestamp.

5. A network node in a core network of a communication network configured sending an enhanced restart notification to a receiving network node, the network node comprising:

communication circuitry for communicating with an exposing network node in the communication network; and processing circuitry configured to:

associate a timestamp in a restart notification related to the restart of a network function NF entity with a binding level of a session context served by the NF entity, wherein the binding level for the session context is a NF Service Set; and send, to the receiving network node, the enhanced restart notification including the timestamp, wherein the enhanced restart notification is sent responsive to the restart of the NF Service Set.

6. The network node of claim 5 wherein, the associating comprises determining the binding level of a session served by the NF entity and associating the determined binding level with the timestamp.

7. A network node in a core network of a communication network configured receive an enhanced restart notification to a receiving network node, the network node comprising:

communication circuitry for communicating with an exposing network node in the communication network; and processing circuitry configured to:

receive, from a sending network node, the enhanced restart notification including a timestamp indicating the restart of a network function (NF) entity; and associate the timestamp in the enhanced restart notification with a binding level of a session context served by the NF entity, wherein the binding level for the session context is a NF Service Set.

8. The network node of claim 7 wherein, the associating comprises determining the binding level of a session served by the NF entity and associating the determined binding level with the timestamp.

9. A non-transitory computer-readable storage medium storing executable instructions that, when executed by processing circuitry in a network node causes the network node to:

associate a timestamp in a restart notification related to the restart of a network function NF entity with a binding level of a session context served by the NF entity, wherein the binding level for the session context is a NF Service Set; and send, to the receiving network node, an enhanced restart notification including the timestamp, wherein the enhanced restart notification is sent responsive to the restart of the NF Service Set.

10. The non-transitory computer-readable storage medium of claim 9 wherein, the recovery information comprises an enhanced recovery timestamp associated with the binding level of the session served by the NF entity.

11. The non-transitory computer-readable storage medium of claim 9 wherein, the associating comprises determining the binding level of a session served by the NF entity and associating the determined binding level with the enhanced recovery information.

12. A non-transitory computer-readable storage medium storing executable instructions that, when executed by processing circuitry in a network node causes the network node to:

receive, from a sending network node, an enhanced restart notification including a timestamp indicating the restart of a network function (NF) entity; and associate the timestamp in the enhanced restart notification on with a binding level of a session context served by the NF entity, wherein the binding level for the session context is a NF Service Set.

13. The non-transitory computer-readable storage medium of claim 12 wherein, the associating comprises determining the binding level of a session served by the NF entity and associating the determined binding level with the timestamp.

* * * * *